US012785737B2

(12) United States Patent
Nakajima et al.

(10) Patent No.: US 12,785,737 B2
(45) Date of Patent: Nov. 3, 2026

(54) RADIO FREQUENCY MODULE

(71) Applicant: Murata Manufacturing Co., Ltd., Nagaokakyo (JP)

(72) Inventors: Reiji Nakajima, Nagaokakyo (JP); Takahisa Toyomura, Nagaokakyo (JP); Kazuhiro Ueda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 283 days.

(21) Appl. No.: 18/624,196

(22) Filed: Apr. 2, 2024

(65) Prior Publication Data

US 2024/0333323 A1 Oct. 3, 2024

(30) Foreign Application Priority Data

Apr. 3, 2023 (JP) ................................ 2023-059773

(51) Int. Cl.

*H04B 1/04* (2006.01)
*H04B 1/00* (2006.01)
*H04L 25/03* (2006.01)

(52) U.S. Cl.

CPC ........... *H04B 1/0483* (2013.01); *H04B 1/006* (2013.01); *H04B 1/0458* (2013.01)

(58) Field of Classification Search

None

See application file for complete search history.

(56) References Cited

U.S. PATENT DOCUMENTS 8,081,048 B2 * 12/2011 Okabe .................... H03H 7/463 333/132
8,811,531 B2 * 8/2014 Wright .................... H03F 3/211 375/297
9,660,606 B2 * 5/2017 Lyalin ...................... H03H 7/38
12,562,693 B2 * 2/2026 Honda .................... H03F 1/565
12,568,859 B2 * 3/2026 Jang ...................... H10W 90/00
2013/0187712 A1 * 7/2013 Cabanillas .............. H03F 1/565 330/192
2017/0366145 A1 * 12/2017 Watanabe ............. H03F 1/0205
2018/0102754 A1 * 4/2018 Tanaka ..................... H03H 7/38
2019/0131941 A1 * 5/2019 Ishihara .................. H03F 3/245
2019/0296693 A1 * 9/2019 Ahmed ................... H03F 3/195
2022/0406512 A1 * 12/2022 Ning ................... H01F 17/0006
2023/0061226 A1 * 3/2023 Chen .................. G01R 33/3628
2024/0162594 A1 * 5/2024 Bichler, III ............... H01P 5/10
2024/0186952 A1 * 6/2024 Chen ..................... H03F 1/0205

FOREIGN PATENT DOCUMENTS

JP 2007-124202 A 5/2007

* cited by examiner

*Primary Examiner* — Pablo N Tran

(74) *Attorney, Agent, or Firm* — XSENSUS LLP

(57) ABSTRACT

A radio frequency module includes a first power amplifier, a second power amplifier, and a matching circuit. The matching circuit is connected to an output terminal of the second power amplifier and is connected to a reception path. The matching circuit includes at least one capacitor, an inductor connected in series to the at least one capacitor, and a selection switch. The matching circuit switches between an impedance matching function and a harmonic wave suppression function of reducing harmonic wave noise outputted from the first power amplifier by switching a state of the selection switch.

20 Claims, 19 Drawing Sheets

RADIO FREQUENCY MODULE

CROSS-REFERENCE TO RELATED APPLICATION

This application claims priority to Japanese Patent Application No. JP 2023-059773 filed on Apr. 3, 2023. The entire contents of the above-identified application, including the specifications, drawings and claims, are incorporated herein by reference in their entirety.

BACKGROUND OF THE DISCLOSURE

1. Field of the Disclosure

The present disclosure generally relates to a radio frequency module, and more specifically relates to a radio frequency module including a plurality of power amplifiers.

2. Description of the Related Art

Japanese Unexamined Patent Application Publication No. 2007-124202 discloses a radio frequency module that includes a first power amplification semiconductor element (first power amplifier), a second power amplification semiconductor element (second power amplifier), an output matching circuit that performs impedance matching on an output side of the second power amplification semiconductor element, and a reception system (reception path) that is connected to the second power amplification semiconductor element via the output matching circuit on the output side of the second power amplification semiconductor element.

SUMMARY OF THE DISCLOSURE

In a radio frequency module including a first power amplifier and a second power amplifier, harmonic wave noise outputted from an output terminal of the first power amplifier may be a problem. The radio frequency module disclosed in Japanese Unexamined Patent Application Publication No. 2007-124202 is provided with an open stub disposed in a stage before the output matching circuit and has an added function of reducing an unnecessary signal generated from the second power amplification semiconductor element, so that the size of the radio frequency module may increase.

Accordingly, the present disclosure describes a radio frequency module capable of achieving size reduction while harmonic wave noise is suppressed.

A radio frequency module according to an aspect of the present disclosure includes a first power amplifier, a second power amplifier, and a matching circuit. The first power amplifier is configured to be able to amplify a signal in a first communication band. The second power amplifier is configured to be able to amplify a signal in a second communication band different from the first communication band. The matching circuit is connected to an output terminal of the second power amplifier and connected to a reception path. The matching circuit includes at least one capacitor, an inductor connected in series to the at least one capacitor, and a selection switch. The matching circuit switches between an impedance matching function and a harmonic wave suppression function of reducing harmonic wave noise outputted from the first power amplifier by switching a state of the selection switch.

A radio frequency module according to another aspect of the present disclosure includes a first power amplifier, a second power amplifier, and a matching circuit. The first power amplifier is configured to be able to amplify a signal in a first communication band. The second power amplifier is configured to be able to amplify a signal in a second communication band different from the first communication band. The matching circuit is connected to an output terminal of the second power amplifier and connected to a reception path. The matching circuit includes a first capacitor, an inductor, and a second capacitor that are connected in series between a transmission path connected to the output terminal of the second power amplifier and a ground, and a selection switch that is connected in parallel to the second capacitor. A capacitance of the first capacitor is larger than a capacitance of the second capacitor.

The radio frequency module according to the above aspect of the present disclosure can achieve size reduction while harmonic wave noise is suppressed.

DESCRIPTION OF THE PREFERRED EMBODIMENTS

Figure 1:
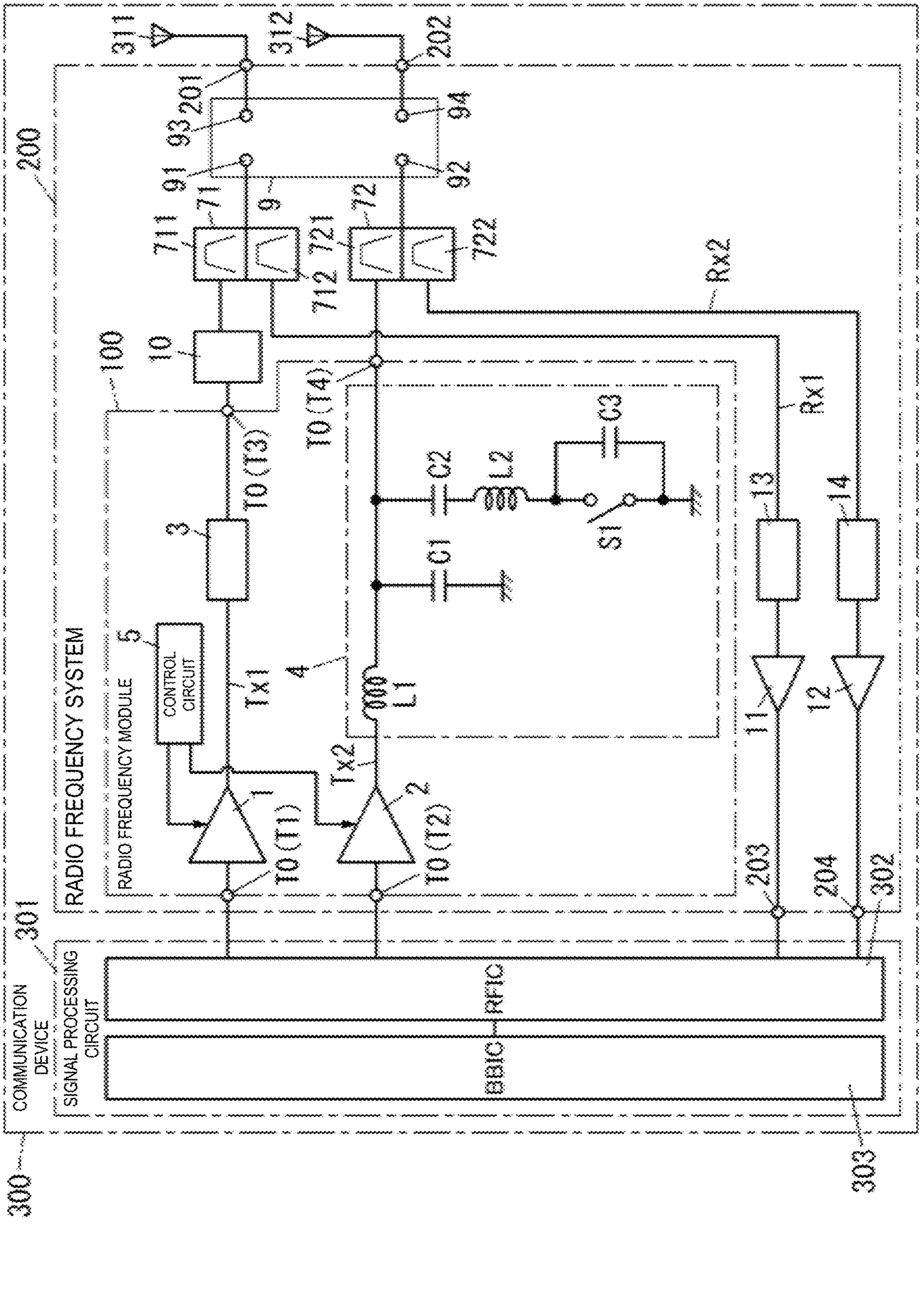
FIG. 1 is a circuit diagram of a radio frequency module according to Embodiment 1.

Hereinafter, Embodiments 1 to 9 will be described with reference to the drawings. The drawings referred to in the following embodiment and the like are schematic drawings, the sizes and thicknesses of the components in the drawings do not necessarily reflect actual dimensions, and the ratio of the sizes and the ratio of the thicknesses between the components do not necessarily reflect the actual dimensional ratios.

Embodiment 1

Hereinafter, a radio frequency module 100 according to Embodiment 1 will be described with reference to the drawings.

A radio frequency system 200 including the radio frequency module 100 according to Embodiment 1 is used in, for example, a communication device 300 as shown in FIG. 1. The communication device 300 is, for example, a mobile phone (for example, a smart phone), but is not limited thereto, and may be, for example, a wearable terminal (for example, a smart watch). The radio frequency module 100 is a module that can correspond to, for example, the 2G (second generation mobile communication) standard, the 4G (fourth generation mobile communication) standard, the 5G (fifth generation mobile communication) standard, or the like. The 2G standard is, for example, a global system for mobile communications (GSM) (registered trademark) standard. The 4G standard is, for example, a third generation partnership project (3GPP) (registered trademark) long term evolution (LTE) standard (registered trademark). The 5G standard is, for example, 5G new radio (NR).

(1) Circuit Configuration of Radio Frequency Module, Radio Frequency System and Communication Device Hereinafter, the circuit configurations of the radio frequency module 100, the radio frequency system 200, and the communication device 300 according to Embodiment 1 will be described with reference to the drawings.

(1.1) Circuit Configuration of Radio Frequency Module and Radio Frequency System As shown in FIG. 1, the radio frequency system 200 includes a radio frequency module 100, a first duplexer 71, a second duplexer 72, a switch 9 (hereinafter, also referred to as an antenna switch 9), a band select switch 10, a first low noise amplifier 11, a second low noise amplifier 12, a first input matching circuit 13, a second input matching circuit 14, a first antenna terminal 201, a second antenna terminal 202, a first external output terminal 203, and a second external output terminal 204.

As shown in FIG. 1, the radio frequency module 100 includes a first power amplifier 1, a second power amplifier 2, a first output matching circuit 3, a second output matching circuit (matching circuit) 4, a control circuit 5, and a plurality of external connection terminals T0.

The first power amplifier 1 has an input terminal, an output terminal, and a control terminal. The input terminal of the first power amplifier 1 is connected to a signal processing circuit 301 of the communication device 300 via a first signal input terminal T1 included in the plurality of external connection terminals T0. The output terminal of the first power amplifier 1 is connected to, for example, a first antenna 311 of the communication device 300 via the band select switch 10, the first duplexer 71, and the antenna switch 9. The first power amplifier 1 amplifies a radio frequency transmission signal (hereinafter, referred to as a first transmission signal) in a first predetermined band outputted from the signal processing circuit 301 and outputs the amplified signal.

The second power amplifier 2 has an input terminal, an output terminal, and a control terminal. The input terminal of the second power amplifier 2 is connected to the signal processing circuit 301 of the communication device 300 via a second signal input terminal T2 included in the plurality of external connection terminals T0. The output terminal of the second power amplifier 2 is connected to, for example, a second antenna 312 of the communication device 300 via the second duplexer 72 and the antenna switch 9. The second power amplifier 2 amplifies a radio frequency transmission signal (hereinafter, referred to as a second transmission signal) in a second predetermined band outputted from the signal processing circuit 301 and outputs the amplified signal.

The first output matching circuit 3 is connected between the output terminal of the first power amplifier 1 and a first signal output terminal T3 included in the plurality of external connection terminals T0. In the radio frequency system 200, the first output matching circuit 3 is connected to a first transmission filter 711 included in the first duplexer 71 via the first signal output terminal T3 and the band select switch 10. The first output matching circuit 3 is a circuit for performing impedance matching between the first power amplifier 1 and the first transmission filter 711. The first output matching circuit 3 includes, for example, a plurality of inductors and a plurality of capacitors.

A second output matching circuit 4 is connected between the output terminal of the second power amplifier 2 and a second signal output terminal T4 included in the plurality of external connection terminals T0. In the radio frequency system 200, the second output matching circuit 4 is connected to a second transmission filter 721 included in the second duplexer 72 via the second signal output terminal T4. The second output matching circuit 4 is a circuit for performing impedance matching between the second power amplifier 2 and the second transmission filter 721.

The second output matching circuit 4 includes, for example, a plurality of (two in the example of FIG. 1) inductors L1 and L2, a plurality of (three in the example of FIG. 1) capacitors C1, C2, and C3, and one a selection switch S1.

The inductor L1 is provided in a second transmission path Tx2 and is connected to a connection between the output terminal of the second power amplifier 2 and the second signal output terminal T4. More specifically, one end (first end) of the inductor L1 is connected to the output terminal of the second power amplifier 2, and the other end (second end) of the inductor L2 is connected to the second signal output terminal T4.

The capacitor C1 is connected between the path between the inductor L1 and the second signal output terminal T4 in the second transmission path Tx2 and a ground. More specifically, one end (first end) of the capacitor C1 is connected to the other end of the inductor L1 and the second signal output terminal T4, and the other end (second end) of the capacitor C1 is connected to a ground.

The capacitor C2, the inductor L2, and the capacitor C3 are connected in series between the second transmission path Tx2 and a ground. Here, the capacitor C2, the inductor L2, and the capacitor C3 are connected in series between the path between the inductor L1 and the second signal output terminal T4 in the second transmission path Tx2 and a ground. More specifically, one end of the capacitor C2 is connected to the path between the inductor L1 and the second signal output terminal T4 in the second transmission path Tx2, the other end of the capacitor C2 is connected to one end of the inductor L2, the other end of the inductor L2 is connected to the capacitor C3, and the other end of the capacitor C3 is connected to a ground.

The series circuit including the capacitor C2, the inductor L2, and the capacitor C3 is connected to the second transmission filter 721 of the second duplexer 72 via the second signal output terminal T4 without any of the remaining plurality of circuit elements (the inductor L1 and the capacitor C1) included in the second output matching circuit 4 interposed therebetween.

In the second output matching circuit 4, the capacitance of the capacitor C2 is larger than the capacitance of the capacitor C3. In the second output matching circuit 4, for example, the capacitance of the capacitor C2 is 100 pF and the capacitance of the capacitor C3 is 0.1 pF.

The selection switch S1 is connected in parallel to the capacitor C3. The selection switch S1 is, for example, a metal oxide semiconductor field effect transistor (MOSFET). The selection switch S1 is controlled by, for example, the control circuit 5. The second output matching circuit 4 switches between the impedance matching function and the harmonic wave suppression function of reducing harmonic wave noise outputted from the first power amplifier 1 by switching the state of the selection switch S1. The state of the selection switch S1 includes on (on state) and off (off state). Assuming the second power amplifier 2 is configured to be operable, the selection switch S1 is controlled to be off by the control circuit 5. Assuming the first power amplifier 1 is configured to be operable, the selection switch S1 is controlled to be on by the control circuit 5. "Assuming the second power amplifier 2 is configured to be operable" assumes that the second power amplifier 2 power-amplifies the second transmission signal (signal) inputted to the input terminal of the second power amplifier 2 and outputs the amplified signal from the output terminal of the second power amplifier 2. Whether or not the second power amplifier 2 power-amplifies the second transmission signal and outputs the amplified signal from the output terminal of the second power amplifier 2 can be confirmed by measuring a bandpass characteristic from the input terminal of the second power amplifier 2 to the output terminal by a network analyzer. "Assuming the first power amplifier 1 is configured to be operable" assumes that the first power amplifier 1 power-amplifies the first transmission signal (signal) inputted to the input terminal of the first power amplifier 1 and outputs the amplified signal from the output terminal of the first power amplifier 1. Whether or not the first power amplifier 1 power-amplifies the first transmission signal and outputs the amplified signal from the output terminal of the first power amplifier 1 can be confirmed by measuring a bandpass characteristic from the input terminal of the first power amplifier 1 to the output terminal by a network analyzer. In the radio frequency module 100 according to Embodiment 1, the first power amplifier 1 and the second power amplifier 2 do not operate at the same time. That is, in the radio frequency module 100, assuming the first power amplifier 1 is configured to be operable, the second power amplifier 2 does not operate, and assuming the second power amplifier 2 is configured to be operable, the first power amplifier 1 is not operated.

In the second output matching circuit 4, assuming the selection switch S1 is off, for example, assuming that the parasitic capacitance of the selection switch S1 is 0.2 pF, the combined capacitance of the parasitic capacitance of the selection switch S1 and the capacitance of the capacitor C3 is 0.3 pF. The combined capacitance of 0.3 pF and the capacitance of the capacitor C2 is approximately 0.3 pF. Therefore, assuming the selection switch S1 is off, the capacitance of the capacitor C2 is more than two orders of magnitude larger than the capacitance of the capacitor C3, so that a circuit including the capacitor C2, the inductor L2, the capacitor C3, and the selection switch S1 can be regarded as, in terms of an equivalent circuit, a circuit in which a series circuit of a 0.3 pF capacitor and the inductor L2 is connected between the second transmission path Tx2 and a ground.

In the second output matching circuit 4, assuming the selection switch S1 is on, the circuit including the capacitor C2, the inductor L2, the capacitor C3, and the selection switch S1 can be regarded as, in terms of an equivalent circuit, a circuit (LC resonance circuit) in which a series circuit of the capacitor C2 of 100 pF and the inductor L2 is connected between the second transmission path Tx2 and a ground. The resonant frequency of the LC resonance circuit is determined by the frequency of the harmonic wave noise so as to attenuate the harmonic wave noise.

The control circuit 5 is connected to an RF signal processing circuit 302 of the signal processing circuit 301 via external control terminals included in the plurality of external connection terminals T0. In addition, the control circuit 5 controls the first power amplifier 1 and the second power amplifier 2, for example, according to the control signal from the signal processing circuit 301. The control circuit 5 is connected to the control terminal of the first power amplifier 1 and the control terminal of the second power amplifier 2. The control circuit 5 controls a magnitude and a supply timing of a bias current (or bias voltage) to be supplied to the control terminal of the first power amplifier 1. In addition, the control circuit 5 controls a magnitude and a supply timing of a bias current (or bias voltage) to be supplied to the control terminal of the second power amplifier 2.

In addition, the control circuit 5 also controls the selection switch S1 of the second output matching circuit 4 according to the control signal from the signal processing circuit 301. More specifically, the control circuit 5 controls the selection switch S1 to be off assuming the second power amplifier 2 is operated. The control circuit 5 controls the selection switch S1 to be on assuming the first power amplifier 1 is operated.

The plurality of external connection terminals T0 include the first signal input terminal T1, the second signal input terminal T2, the first signal output terminal T3, the second signal output terminal T4, a plurality of external control terminals, and a plurality of ground terminals.

The first duplexer 71 includes the first transmission filter 711 and a first reception filter 712. The first transmission filter 711 has a pass band that includes a transmission band of a first communication band. The first reception filter 712 has a pass band that includes the reception band of the first communication band. The first duplexer 71 has a first common terminal, a first input terminal, and a first output terminal. The first common terminal is an input/output terminal common to the first transmission filter 711 and the first reception filter 712, and is connected to the first antenna 311 via the antenna switch 9. The first input terminal of the first duplexer 71 is an input terminal of the first transmission filter 711 and is connected to a first transmission path Tx1 provided in the radio frequency module 100 via the band select switch 10. As a result, the first transmission filter 711 of the first duplexer 71 is connected to the output terminal of the first power amplifier 1 via the first output matching circuit 3 provided in the first transmission path Tx1. The first output terminal of the first duplexer 71 is the output terminal of the first reception filter 712, and is connected to, for example, a first reception path Rx1 provided in the radio frequency system 200. As a result, the first reception filter 712 of the first duplexer 71 is connected to the signal processing circuit 301 of the communication device 300 via the first input matching circuit 13 and the first low noise amplifier 11 provided in the first reception path Rx1.

The second duplexer 72 includes the second transmission filter 721 and a second reception filter 722. The second transmission filter 721 has a pass band that includes a transmission band of a second communication band. The second reception filter 722 has a pass band that includes a reception band of the second communication band. The frequency of the harmonic wave of the transmission band of the first communication band is included in the frequency of the reception band of the second communication band. The second duplexer 72 has a second common terminal, a second input terminal, and a second output terminal. The second common terminal is an input/output terminal common to the second transmission filter 721 and the second reception filter 722, and is connected to the second antenna 312 via the antenna switch 9. The second input terminal of the second duplexer 72 is an input terminal of the second transmission filter 721 and is connected to the second transmission path Tx2 provided in the radio frequency module 100. As a result, the second transmission filter 721 of the second duplexer 72 is connected to the output terminal of the second power amplifier 2 via the second output matching circuit 4 provided in the second transmission path Tx2. The second output terminal of the second duplexer 72 is the output terminal of the second reception filter 722, and is connected to, for example, a second reception path Rx2 of the radio frequency system 200. As a result, the second reception filter 722 of the second duplexer 72 is connected to the signal processing circuit 301 of the communication device 300 via the second input matching circuit 14 and the second low noise amplifier 12 provided in the second reception path Rx2.

In the radio frequency system 200, the first communication band and the second communication band are different from each other. In the radio frequency system 200, for example, the first communication band is a communication band included in the low band of the 2G standard (GSM850 or GSM900 of the GSM standard), and the second communication band is a communication band included in the mid band of the 2G standard (DSC1800 or PCS1900 of the GSM standard). The combination of the first communication band and the second communication band is not limited to a combination of a low band of the 2G standard and a mid band of the 2G standard, and may be, for example, a combination of a low band of the 4G standard or the 5G standard and a mid-high band of the 4G standard or the 5G standard.

The antenna switch 9 includes a first terminal 91 to which the first common terminal of the first duplexer 71 is connected, a second terminal 92 to which the second common terminal of the second duplexer 72 is connected, a third terminal 93 that is connected to the first antenna terminal 201, and a fourth terminal 94 that is connected to the second antenna terminal 202. In the radio frequency system 200, the third terminal 93 and the first antenna terminal 201 are not limited to being connected to each other without other circuit elements interposed therebetween, and may be connected to each other, for example, via a low pass filter and a coupler. In addition, in the radio frequency system 200, the fourth terminal 94 and the second antenna terminal 202 are not limited to being connected to each other without other circuit elements interposed therebetween, and may be connected to each other, for example, via a low pass filter and a coupler. The antenna switch 9 can switch among a first state in which the first terminal 91 and the third terminal 93 are connected, a second state in which the second terminal 92 and the fourth terminal 94 are connected, a third state in which the first terminal 91 and the fourth terminal 94 are connected, and a fourth state in which the second terminal 92 and the third terminal 93 are connected. The antenna switch 9 is a switch IC. The antenna switch 9 is controlled by, for example, the signal processing circuit 301. The antenna switch 9 switches among the first state, the second state, the third state, and the fourth state according to a control signal from the RF signal processing circuit 302 of the signal processing circuit 301.

The band select switch 10 is provided between the first output matching circuit 3 provided in the transmission path Tx1 and the first transmission filter 711. The band select switch 10 has a common terminal and a plurality of selection terminals (not shown). The common terminal of the band select switch is connected to the first output terminal of the first power amplifier 1 via the first output matching circuit 3. For example, a plurality of transmission filters corresponding to communication bands different from each other are respectively connected to the plurality of selection terminals. The plurality of transmission filters include a first transmission filter 711. One of the plurality of selection terminals of the band select switch 10 is connected to the first transmission filter 711. The band select switch 10 is the switch IC. The band select switch 10 is controlled by, for example, the signal processing circuit 301. The antenna switch 9 switches the connection state between the common terminal and the plurality of selection terminals according to the control signal from the RF signal processing circuit 302 of the signal processing circuit 301.

The first low noise amplifier 11 has an input terminal and an output terminal. The first low noise amplifier 11 amplifies the reception signal inputted to the input terminal of the first low noise amplifier 11, and outputs the amplified signal from the output terminal of the first low noise amplifier 11. The input terminal of the first low noise amplifier 11 is connected to the first reception filter 712 via the first input matching circuit 13. The output terminal of the first low noise amplifier 11 is connected to the signal processing circuit 301 of the communication device 300 via the first external output terminal 203.

The second low noise amplifier 12 has an input terminal and an output terminal. The second low noise amplifier 12 amplifies the reception signal inputted to the input terminal of the second low noise amplifier 12, and outputs the amplified signal from the output terminal of the second low noise amplifier 12. The input terminal of the second low noise amplifier 12 is connected to the second reception filter 722 via the second input matching circuit 14. The output terminal of the second low noise amplifier 12 is connected to the signal processing circuit 301 of the communication device 300 via the second external output terminal 204.

The first input matching circuit 13 is a circuit for performing impedance matching between the first low noise amplifier 11 and the first reception filter 712. The first input matching circuit 13 includes, for example, an inductor.

The second input matching circuit 14 is a circuit for performing impedance matching between the second low noise amplifier 12 and the second reception filter 722. The second input matching circuit 14 includes, for example, an inductor.

The first antenna terminal 201 of the radio frequency system 200 is connected to, for example, the first antenna 311 of the communication device 300.

The second antenna terminal 202 of the radio frequency system 200 is connected to, for example, the second antenna 312 of the communication device 300.

The first external output terminal 203 of the radio frequency system 200 is connected to, for example, the signal processing circuit 301 of the communication device 300.

The second external output terminal 204 of the radio frequency system 200 is connected to, for example, the signal processing circuit 301 of the communication device 300.

(1.2) Circuit Configuration of Communication Device

As shown in FIG. 1, the communication device 300 includes the radio frequency system 200, the signal processing circuit 301, the first antenna 311, and the second antenna 312.

The first antenna 311 transmits a first transmission signal that is amplified by the first power amplifier 1 and outputted from the first antenna terminal 201.

The second antenna 312 transmits a second transmission signal that is amplified by the second power amplifier 2 and outputted from the second antenna terminal 202.

The signal processing circuit 301 includes the RF signal processing circuit 302 and a baseband signal processing circuit 303. The RF signal processing circuit 302 is, for example, a radio frequency integrated circuit (RFIC) and performs signal processing on a radio frequency signal. The RF signal processing circuit 302, for example, performs signal processing, such as upconverting, on a radio frequency signal (transmission signal) outputted from the baseband signal processing circuit 303, and outputs the radio frequency signal on which the signal processing is performed. In addition, the RF signal processing circuit 302, for example, performs signal processing, such as down conversion, on a radio frequency signal (reception signal) outputted from the radio frequency system 200, and outputs the radio frequency signal on which the signal processing is performed to the baseband signal processing circuit 303. The baseband signal processing circuit 303 is, for example, a baseband integrated circuit (BBIC). The baseband signal processing circuit 303 generates an I phase signal and a Q phase signal from the baseband signal. The baseband signal is, for example, an audio signal or an image signal inputted from the outside. The baseband signal processing circuit 303 performs IQ modulation processing by combining the I phase signal and the Q phase signal, and outputs a transmission signal. At this time, the transmission signal is generated as a modulation signal (IQ signal) in which a carrier wave signal of a predetermined frequency is amplitude-modulated in a period longer than a period of the carrier wave signal. The reception signal processed by the baseband signal processing circuit 303 is used, for example, as an image signal for image display or as an audio signal for a call by the user of the communication device 300.

(2) Structure of Radio Frequency Module

Figure 2:
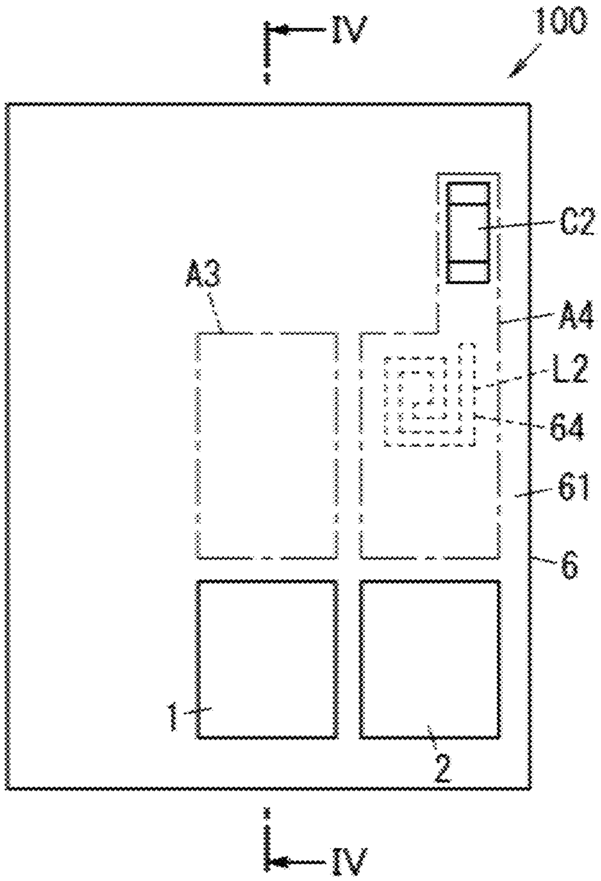
FIG. 2 is a plan view of the radio frequency module according to Embodiment 1.
Figure 3:
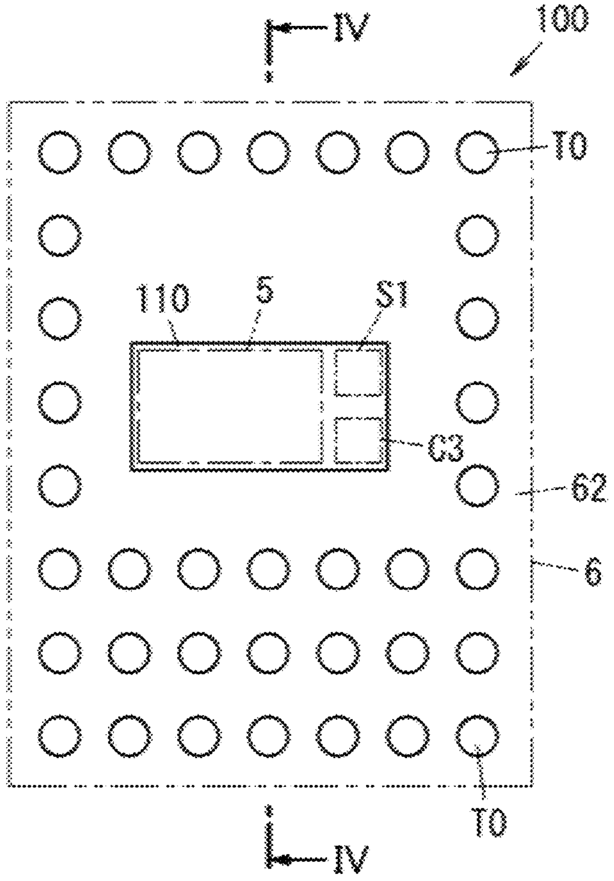
FIG. 3 is a plan view viewed through from a side of a first main surface of a module substrate to a side of a second main surface, relating to the radio frequency module according to Embodiment 1.
Figure 4:
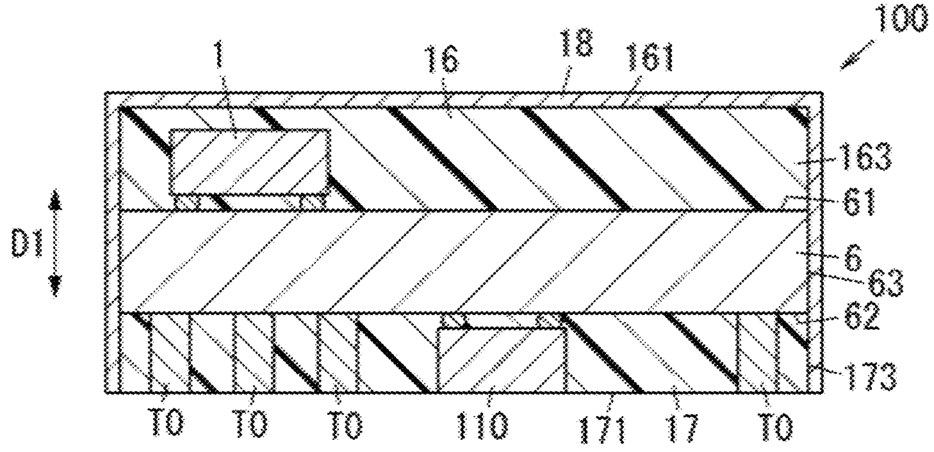
FIG. 4 is a cross-sectional view taken along line IV-IV in FIG. 2, relating to the radio frequency module according to Embodiment 1.

As shown in FIGS. 2 to 4, the radio frequency module 100 according to Embodiment 1 includes a module substrate 6, the first power amplifier 1, the second power amplifier 2, an IC (IC chip) 110, the first output matching circuit 3 (see FIG. 1), the second output matching circuit 4 (see FIG. 1), and the plurality of external connection terminals T0. In addition, the radio frequency module 100 according to Embodiment 1 further includes a resin layer 16 (hereinafter, also referred to as a first resin layer 16), a second resin layer 17, and a shield electrode layer 18. In FIG. 2, the first resin layer 16 and the shield electrode layer 18 are omitted. In addition, in FIG. 3, the second resin layer 17 is omitted.

As shown in FIGS. 2 to 4, the module substrate 6 has a first main surface 61 and a second main surface 62 that face each other in a thickness direction D1 of the module substrate 6. In plan view from the thickness direction D1 of the module substrate 6, an outer edge of the module substrate 6 has, for example, a rectangular shape, but may have a shape other than a rectangular shape. The module substrate 6 is, for example, a multilayer substrate in which a plurality of dielectric layers and a plurality of conductive layers (not shown) are laminated. The plurality of conductive layers are formed in a predetermined pattern determined for each layer. Each of the plurality of conductive layers includes one or a plurality of conductor portions in one plane orthogonal to the thickness direction D1 of the module substrate 6. A material of each conductive layer is, for example, copper. The plurality of conductive layers include a ground layer. The ground layer of the module substrate 6 is electrically connected to at least one external ground terminal included in the plurality of external connection terminals T0 via a via conductor or the like of the module substrate 6.

The module substrate 6 is, for example, a low temperature co-fired ceramics (LTCC) substrate. The module substrate 6 is not limited to the LTCC substrate, and may be, for example, a printed wiring board, a high temperature co-fired ceramics (HTCC) substrate, a resin multilayer substrate, or a component built-in substrate.

In the radio frequency module 100, a plurality of first electronic components are disposed on the first main surface 61 of the module substrate 6. "The first electronic component is disposed on the first main surface 61 of the module substrate 6" includes that the first electronic component is mounted on (mechanically connected to) the first main surface 61 of the module substrate 6 and that the first electronic component is electrically connected to (an appropriate conductor portion of) the module substrate 6. The plurality of first electronic components include the first power amplifier 1, the second power amplifier 2, a plurality of circuit elements (a plurality of inductors and capacitors) of the first output matching circuit 3, and some circuit elements (the inductor L1 and the two capacitors C1 and C2) among a plurality of circuit elements of the second output matching circuit 4.

In plan view from the thickness direction D1 of the module substrate 6, an outer edge of the first power amplifier 1 has, for example, a rectangular shape. The first power amplifier 1 is a power amplification IC. The first power amplifier 1 is, for example, a GaAs-based IC assuming an amplification transistor included in the first power amplifier 1 is a bipolar transistor. In addition, the first power amplifier 1 is, for example, a Si-based IC assuming the amplification transistor is a field effect transistor (FET).

In plan view from the thickness direction D1 of the module substrate 6, an outer edge of the second power amplifier 2 has, for example, a rectangular shape. The second power amplifier 2 is a power amplification IC. The second power amplifier 2 is, for example, a GaAs-based IC assuming an amplification transistor included in the second power amplifier 2 is a bipolar transistor. In addition, the second power amplifier 2 is, for example, a Si-based IC assuming the amplification transistor is a FET.

In plan view from the thickness direction D1 of the module substrate 6, an outer edge of the capacitor C2 has, for example, a rectangular shape. The capacitor C2 is a chip capacitor. In other words, the capacitor C2 is a surface mount capacitor.

In FIG. 2, a plurality of circuit elements of the first output matching circuit 3 are not shown, and an area A3, in which the plurality of circuit elements of the first output matching circuit 3 are disposed on the first main surface 61 of the module substrate 6, is shown by one-dot chain line. Some circuit elements among the plurality of circuit elements of the first output matching circuit 3 may be built in the module substrate 6.

In addition, in FIG. 2, the inductor L1 and capacitor C1 of the second output matching circuit 4 are not shown, and an area A4, in which the inductor L1 and the two capacitors C1 and C2 of the second output matching circuit 4 are disposed in the first main surface 61 of the module substrate 6, is shown by one-dot chain line. The inductor L1 is a chip inductor. In other words, the inductor L1 is a surface mount inductor. In addition, the capacitor C1 is a chip capacitor. In addition, the inductor L2 includes a conductor pattern portion 64 disposed in the module substrate 6.

In the radio frequency module 100, a second electronic component is disposed on the second main surface 62 of the module substrate 6. "The second electronic component is disposed on the second main surface 62 of the module substrate 6" includes that the second electronic component is mounted on (mechanically connected to) the second main surface 62 of the module substrate 6 and that the second electronic component is electrically connected to (an appropriate conductor portion of) the module substrate 6. The second electronic component includes the IC 110 (see FIGS. 3 and 4).

The IC 110 is, for example, a Si-based IC including a silicon on insulator (SOI) substrate. A Si-based IC may include a silicon substrate instead of the SOI substrate.

In plan view from the thickness direction D1 of the module substrate 6, the outer edge of the IC 110 has a rectangular shape.

As shown in FIG. 3, the IC 110 includes the control circuit 5, and the capacitor C3 and the selection switch S1 of the second output matching circuit 4.

In the IC 110, the selection switch S1 is, for example, a MOSFET.

In the IC 110, the capacitor C3 and the selection switch S1 are adjacent to each other in plan view from the thickness direction D1 of the module substrate 6. "The capacitor C3 and the selection switch S1 are adjacent to each other" corresponds to, in plan view from the thickness direction D1 of the module substrate 6, the capacitor C3 and the selection switch S1 are disposed without another circuit element being disposed between the capacitor C3 and the selection switch S1.

The plurality of external connection terminals T0 shown in FIG. 3 include the first signal input terminal T1 (see FIG. 1), the second signal input terminal T2 (see FIG. 1), the first signal output terminal T3, the second signal output terminal T4, a plurality of external control terminals (not shown), and a plurality of ground terminals (not shown). The first signal input terminal T1, the second signal input terminal T2, and the plurality of external control terminals are connected to the RF signal processing circuit 302 of the signal processing circuit 301. The first signal output terminal T3 is connected to the band select switch 10 of the radio frequency system 200. The second signal output terminal T4 is connected to the second transmission filter 721 of the second duplexer 72 of the radio frequency system 200. The plurality of ground terminals are electrically connected to the ground layer of the module substrate 6. The ground layer is a circuit ground of the radio frequency module 100.

Materials of the plurality of external connection terminals T0 are, for example, metal (for example, copper, copper alloy, or the like). The plurality of external connection terminals T0 are not components of the module substrate 6, but may be components of the module substrate 6. Each of the plurality of external connection terminals T0 is a columnar electrode (a cylindrical electrode in the examples of FIGS. 3 and 4).

As shown in FIG. 4, the first resin layer 16 is disposed on the first main surface 61 of the module substrate 6, and covers a portion of each of the plurality of first electronic components included in the radio frequency module 100 and the module substrate 6 and the first main surface 61. The first resin layer 16 contains resin (for example, epoxy resin). The first resin layer 16 may contain a filler in addition to resin. The first resin layer 16 has electric insulation.

The second resin layer 17 is disposed on the second main surface 62 of the module substrate 6. The second resin layer 17 covers an outer peripheral surface of the second electronic component (the IC 110) disposed on the second main surface 62 of the module substrate 6 and an outer peripheral surface of each of the plurality of external connection terminals T0. The second resin layer 17 does not cover a main surface of the second electronic component opposite to a side of the module substrate 6. The second resin layer 17 contains resin (for example, epoxy resin). The second resin layer 17 may contain a filler in addition to resin. The material of the second resin layer 17 may be the same material as the material of the first resin layer 16 or may be a different material.

As shown in FIG. 4, the shield electrode layer 18 covers the first resin layer 16 and the module substrate 6. More specifically, the shield electrode layer 18 covers a main surface 161 and an outer peripheral surface 163 of the first resin layer 16, an outer peripheral surface 63 of the module substrate 6, and an outer peripheral surface 173 of the second resin layer 17. In the radio frequency module 100, a main surface 171 of the second resin layer 17 opposite to a side of the module substrate 6 is not covered with the shield electrode layer 18 and is exposed.

The shield electrode layer 18 has conductivity. In the radio frequency module 100, the shield electrode layer 18 is a shield layer provided for the purpose of electromagnetic shielding inside and outside the radio frequency module 100. The shield electrode layer 18 is in contact with at least a portion of an outer peripheral surface of the ground layer of the module substrate 6. Therefore, a potential of the shield electrode layer 18 can be set to be the same as a potential of the ground layer. The shield electrode layer 18 has a multilayer structure in which a plurality of metal layers are laminated, but is not limited to a multilayer structure, and may be one metal layer. The metal layer includes one type or a plurality of types of metals.

(3) Circuit Constant of Some Circuit Elements Among Plurality of Circuit Elements of Second Output Matching Circuit In the second output matching circuit 4, the capacitance of the capacitor C2 is larger than the capacitance of the capacitor C3. "The capacitance of the capacitor C2 is larger than the capacitance of the capacitor C3" corresponds to the capacitance of the capacitor C2 is larger than the capacitance of the capacitor C3 assuming the capacitance of the capacitor C2 and the capacitance of the capacitor C3 are compared. Here, the capacitance of the capacitor C2 and the capacitance of the capacitor C3 are values measured using the first RF probe, the second RF probe, and the network analyzer. In the radio frequency module 100 according to Embodiment 1, the capacitor C2 is a surface mount capacitor, and the capacitor C3 is a capacitor included in the IC 110. Assuming the capacitance of the capacitor is measured, the first RF probe and the second RF probe are directly or indirectly connected to a first terminal electrode and a second terminal electrode of the capacitor, respectively, and via the first RF probe and the second RF probe, the network analyzer is connected between the first terminal electrode and the second terminal electrode of the capacitor, so that the impedance of the capacitor is measured, and the capacitance is obtained. Assuming it is difficult to measure the capacitance of the capacitor included in the IC, first, an electrode area is calculated by infrared analysis or by exposing the pattern surface of the capacitor. Then, the capacitance information per unit area may be referenced from a standard library of processes used in a capacitor manufacturing method, and a capacitance estimated from the referenced capacitance information per unit area may be used as the capacitance of the capacitor. The information on the above process can be estimated by observing a cross section of the structure of the capacitor in the IC with FIB.

(4) Disposition of Radio Frequency Module

The radio frequency module 100 is disposed on, for example, a mother substrate included in the radio frequency system 200. More specifically, the radio frequency module 100 is electrically and mechanically connected to the mother substrate by the plurality of external connection terminals T0. In the radio frequency system 200, the first signal input terminal T1, the second signal input terminal T2, and the external control terminal of the radio frequency module 100 are connected to the signal processing circuit 301 of the communication device 300. In the radio frequency system 200, the first signal output terminal T3 of the radio frequency module 100 is connected to the first transmission filter 711 of the first duplexer 71 disposed on the mother substrate via the band select switch 10. In addition, the second signal output terminal T4 of the radio frequency module 100 is connected to the second transmission filter 721 of the second duplexer 72 disposed on the mother substrate.

(5) Structure of Radio Frequency System

The radio frequency system 200 includes a mother substrate (not shown) and a plurality of electronic components disposed on the mother substrate. The mother substrate is, for example, a printed wiring board. The plurality of electronic components include the radio frequency module 100, the first duplexer 71, the second duplexer 72, the antenna switch 9, the band select switch 10, the first low noise amplifier 11, the second low noise amplifier 12, a circuit element of the first input matching circuit 13, and a circuit element of the second input matching circuit 14.

(6) Structure of Communication Device

The communication device 300 includes the radio frequency system 200, the signal processing circuit 301 disposed on a mother substrate of the radio frequency system 200, the first antenna 311, and the second antenna 312. The communication device 300 may include a second mother substrate on which the radio frequency system 200 and the signal processing circuit 301 are disposed, separately from a first mother substrate that is the mother substrate of the radio frequency system 200.

(7) Connection Relationship Between Second Output Matching Circuit of Radio Frequency Module, and First Transmission Path and Second Reception Path In the radio frequency module 100 according to Embodiment 1, the second output matching circuit 4 is connected to the output terminal of the second power amplifier 2, and the first transmission path Tx1 is connected via electromagnetic field coupling in the space or between the wirings of the mother substrate of the radio frequency system 200. More specifically, the second output matching circuit 4 is connected to the output terminal of the first power amplifier 1 via electromagnetic field coupling in the space from any of the second duplexer 72, the antenna switch 9, the first duplexer 71, the band select switch 10, and the first output matching circuit 3, or between the wirings of the mother substrate of radio frequency system 200. In addition, in the radio frequency module 100 according to Embodiment 1, the second output matching circuit 4 is connected to the second reception path Rx2. More specifically, the second output matching circuit 4 is connected to the second reception path Rx2 via the second duplexer 72.

(8) Comparative Example

In the radio frequency module according to the comparative example, the first output matching circuit provided in the first transmission path connected to the output terminal of the first power amplifier has an impedance matching function, and the second output matching circuit provided in the second transmission path connected to the output terminal of the second power amplifier has an impedance matching function. In the radio frequency module according to the comparative example, for example, assuming the reception path is connected to the second output matching circuit via the duplexer, the harmonic wave noise of the transmission signal outputted from the output terminal of the first power amplifier circulates back into the reception path via the duplexer.

(9) Effect

The radio frequency module 100 according to Embodiment 1 includes the first power amplifier 1, the second power amplifier 2, and the second output matching circuit 4 (matching circuit). The first power amplifier 1 is configured to be able to amplify a signal in the first communication band. The second power amplifier 2 is configured to be able to amplify a signal in a second communication band different from the first communication band. The second output matching circuit 4 is connected to the output terminal of the second power amplifier 2 and connected to the second reception path Rx2 (reception path). The second output matching circuit 4 includes the at least one capacitor C2, the inductor L1 connected in series to the capacitor C2, and the selection switch S1. The second output matching circuit 4 switches between the impedance matching function and the harmonic wave suppression function of reducing harmonic wave noise outputted from the first power amplifier 1 by switching the state of the selection switch S1. As a result, the radio frequency module 100 according to Embodiment 1 can achieve size reduction while harmonic wave noise is suppressed.

In the radio frequency module according to the comparative example, it is necessary to further add a circuit for reducing radio frequency noise to prevent harmonic wave noise from circulating back, and the size increases. On the other hand, in the radio frequency module 100 according to Embodiment 1, the second output matching circuit 4 switches between the impedance matching function and the harmonic wave suppression function of reducing harmonic wave noise outputted from the first power amplifier 1 by switching the state of the selection switch S1, so that size reduction can be achieved while harmonic wave noise is suppressed.

The radio frequency module 100 according to Embodiment 1 includes the first power amplifier 1, the second power amplifier 2, and the second output matching circuit 4 (matching circuit). The first power amplifier 1 is configured to be able to amplify a signal in the first communication band. The second power amplifier 2 is configured to be able to amplify a signal in a second communication band different from the first communication band. The second output matching circuit 4 is connected to the output terminal of the second power amplifier 2 and connected to the second reception path Rx2 (reception path). The second output matching circuit 4 includes the capacitor C2 (first capacitor), the inductor L2, the capacitor C3 (second capacitor) connected in series between the second transmission path Tx2 (transmission path) connected to the output terminal of the second power amplifier 2 and a ground, and the selection switch S1 connected in parallel to the capacitor C3 (second capacitor). The capacitance of the capacitor C2 (first capacitor) is larger than the capacitance of the capacitor C3 (second capacitor). As a result, the radio frequency module 100 according to Embodiment 1 can achieve size reduction while harmonic wave noise is suppressed.

In addition, in the radio frequency module 100 according to Embodiment 1, assuming the first power amplifier 1 is configured to be operable, the selection switch S1 of the second output matching circuit 4 is on, and the second output matching circuit 4 has a harmonic wave suppression function. In addition, in the radio frequency module 100 according to Embodiment 1, assuming the second power amplifier 2 is configured to be operable, the selection switch S1 of the second output matching circuit 4 is off, and the second output matching circuit 4 has an impedance matching function.

According to the above configuration, assuming the first power amplifier 1 operates, the second output matching circuit 4 has the harmonic wave suppression function, and assuming the second power amplifier 2 operates, the second output matching circuit 4 has an impedance matching function. Assuming the first power amplifier 1 operates, harmonic wave noise can be reduced by the second output matching circuit 4, and assuming the second power amplifier 2 operates, impedance matching can be performed by the second output matching circuit 4.

In addition, in the radio frequency module 100 according to Embodiment 1, the series circuit including the capacitor C2, the inductor L2, and the capacitor C3 is connected to the second reception path Rx2 without any of the remaining plurality of circuit elements (inductor L1 and capacitor C1) included in the second output matching circuit 4 interposed therebetween.

According to the above configuration, the harmonic wave noise of the transmission signal outputted from the first power amplifier 1 can be more effectively reduced.

In addition, in the radio frequency module 100 according to Embodiment 1, the selection switch S1 is on assuming the first power amplifier 1 is configured to be operable, and is off assuming the second power amplifier 2 is configured to be operable.

According to the above configuration, assuming the first power amplifier 1 operates, harmonic wave noise can be reduced by the second output matching circuit 4, and assuming the second power amplifier 2 operates, impedance matching can be performed by the second output matching circuit 4.

In addition, in the radio frequency module 100 according to Embodiment 1, the inductor L2 includes the conductor pattern portion 64 formed on the module substrate 6.

According to the above configuration, the design of the inductance of the inductor L2 is easy while size reduction is achieved.

In addition, in the radio frequency module 100 according to Embodiment 1, the selection switch S1 and the capacitor C3 are included in the IC 110.

According to the above configuration, it is possible to achieve further size reduction.

In addition, in the radio frequency module 100 according to Embodiment 1, the IC 110 includes the control circuit 5 that controls the first power amplifier 1 and the second power amplifier 2, and the control circuit 5 controls the selection switch S1.

According to the above configuration, in the control circuit 5, it is possible to synchronize the control of the first power amplifier 1 and the control of the selection switch S1, and it is possible to synchronize the control of the second power amplifier 2 and the control of the selection switch S1.

Embodiment 2

A radio frequency module 100A according to Embodiment 2 will be described with reference to FIGS. 5 to 7. Regarding the radio frequency module 100A according to Embodiment 2, the same components as the radio frequency module 100 (see FIGS. 1 to 4) according to Embodiment 1 are attached with the same reference numerals, and the description thereof will be omitted. In addition, regarding a communication device 300A including the radio frequency module 100A, the same components as the communication device 300 (see FIG. 1) according to Embodiment 1 are attached with the same reference numerals, and the description thereof is (1) Circuit Configuration of Radio Frequency Module and Communication Device (1.1) Circuit Configuration of Radio Frequency Module Similarly to the radio frequency module 100 according to Embodiment 1, the radio frequency module 100A according to Embodiment 2 includes the first power amplifier 1, the second power amplifier 2, the first output matching circuit 3, the second output matching circuit 4, and the control circuit 5.

The radio frequency module 100A according to Embodiment 2 is different from the radio frequency module 100 according to Embodiment 1 in that the band select switch 10, the first duplexer 71, the second duplexer 72, the antenna switch 9, the first low noise amplifier 11, the second low noise amplifier 12, the first input matching circuit 13, and the second input matching circuit 14 are further included. In addition, the radio frequency module 100A is different from the radio frequency module 100 according to Embodiment 1 in that the plurality of external connection terminals T0 further include a first antenna terminal T5, a second antenna terminal T6, a first signal output terminal T7, and a second signal output terminal T8. The plurality of external connection terminals T0 in the radio frequency module 100A according to Embodiment 2 do not include the first signal output terminal T3 and the second signal output terminal T4 among the plurality of external connection terminals T0 of the radio frequency module 100 according to Embodiment 1.

The first antenna terminal T5 is connected to the third terminal 93 of the antenna switch 9. The first antenna terminal T5 is connected to, for example, the first antenna 311 of the communication device 300A.

The second antenna terminal T6 is connected to the fourth terminal 94 of the antenna switch 9. The second antenna terminal T6 is connected to, for example, the second antenna 312 of the communication device 300A.

The first signal output terminal T7 is connected to the output terminal of the first low noise amplifier 11. The first signal output terminal T7 is connected to, for example, the signal processing circuit 301 of the communication device 300A.

The second signal output terminal T8 is connected to the output terminal of the second low noise amplifier 12. The second signal output terminal T8 is connected to, for example, the signal processing circuit 301 of the communication device 300A.

The radio frequency module 100A according to Embodiment 2 has the same circuit configuration as the radio frequency system 200 according to Embodiment 1, and includes the first antenna terminal T5, the second antenna terminal T6, the first signal output terminal T7, and the second signal output terminal T8 instead of the first antenna terminal 201, the second antenna terminal 202, the first external output terminal 203, and the second external output terminal 204 in the radio frequency system 200.

In the radio frequency module 100A, the third terminal 93 and the first antenna terminal T5 are not limited to being connected to each other without other circuit elements interposed therebetween, and may be connected to each other, for example, via a low pass filter and a coupler. In addition, in the radio frequency module 100A, the fourth terminal 94 and the second antenna terminal T6 are not limited to being connected to each other without other circuit elements interposed therebetween, and may be connected to each other, for example, via a low pass filter and a coupler.

(1.2) Circuit Configuration of Communication Device

Figure 5:
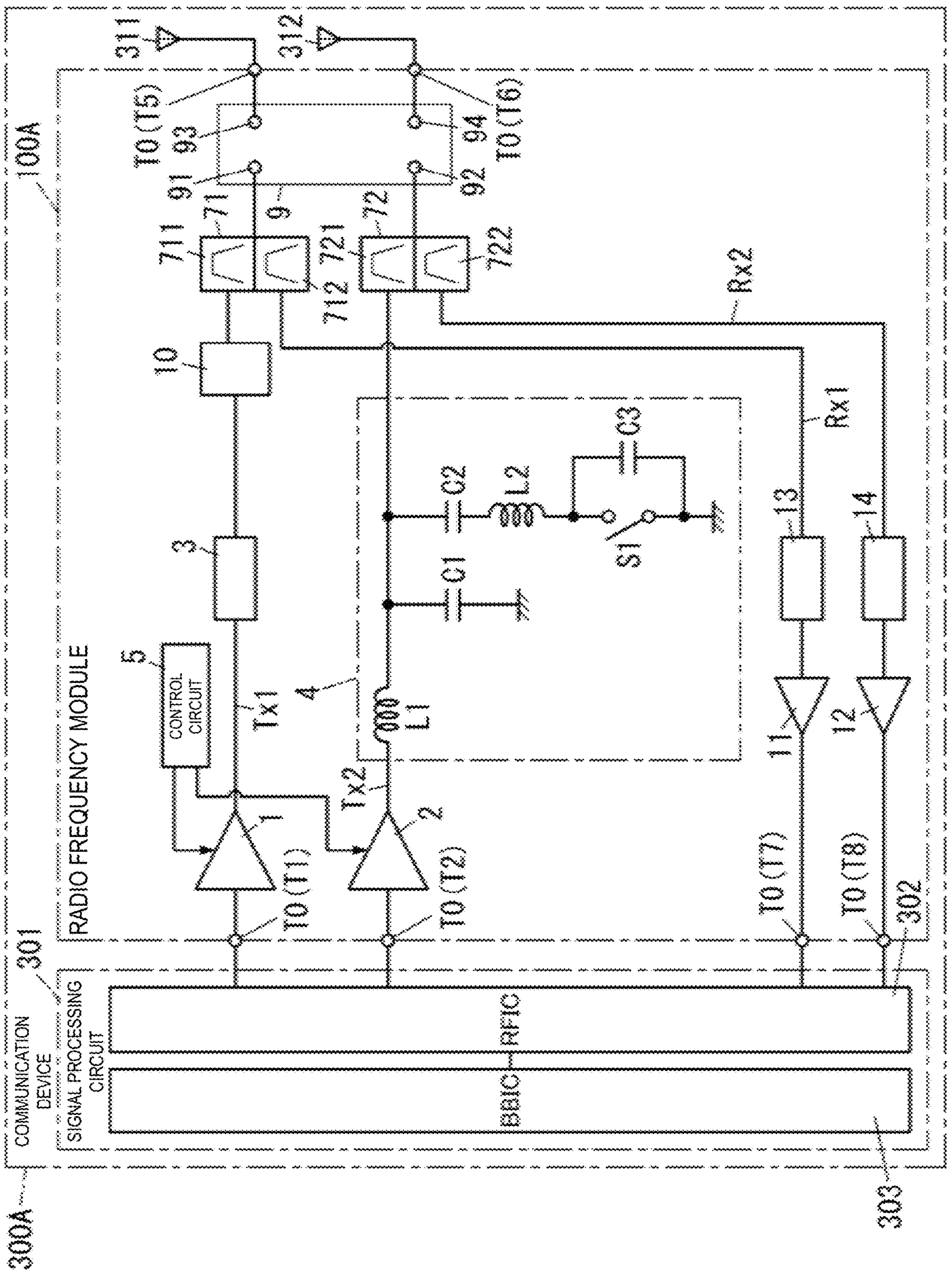
FIG. 5 is a circuit diagram of a radio frequency module according to Embodiment 2.

As shown in FIG. 5, the communication device 300A includes the radio frequency module 100A, the signal processing circuit 301, the first antenna 311, and the second antenna 312.

The first antenna 311 transmits a first transmission signal that is amplified by the first power amplifier 1 and outputted from the first antenna terminal T5.

The second antenna 312 transmits a second transmission signal that is amplified by the second power amplifier 2 and outputted from the second antenna terminal T6.

The signal processing circuit 301 includes the RF signal processing circuit 302 and a baseband signal processing circuit 303. The RF signal processing circuit 302, for example, performs signal processing, such as upconverting, on a radio frequency signal (transmission signal) outputted from the baseband signal processing circuit 303, and outputs the radio frequency signal on which the signal processing is performed. In addition, the RF signal processing circuit 302, for example, performs signal processing, such as down conversion, on a radio frequency signal (reception signal) outputted from the radio frequency module 100A, and outputs the radio frequency signal on which the signal processing is performed to the baseband signal processing circuit 303.

(2) Structure of Radio Frequency Module

Figure 6:
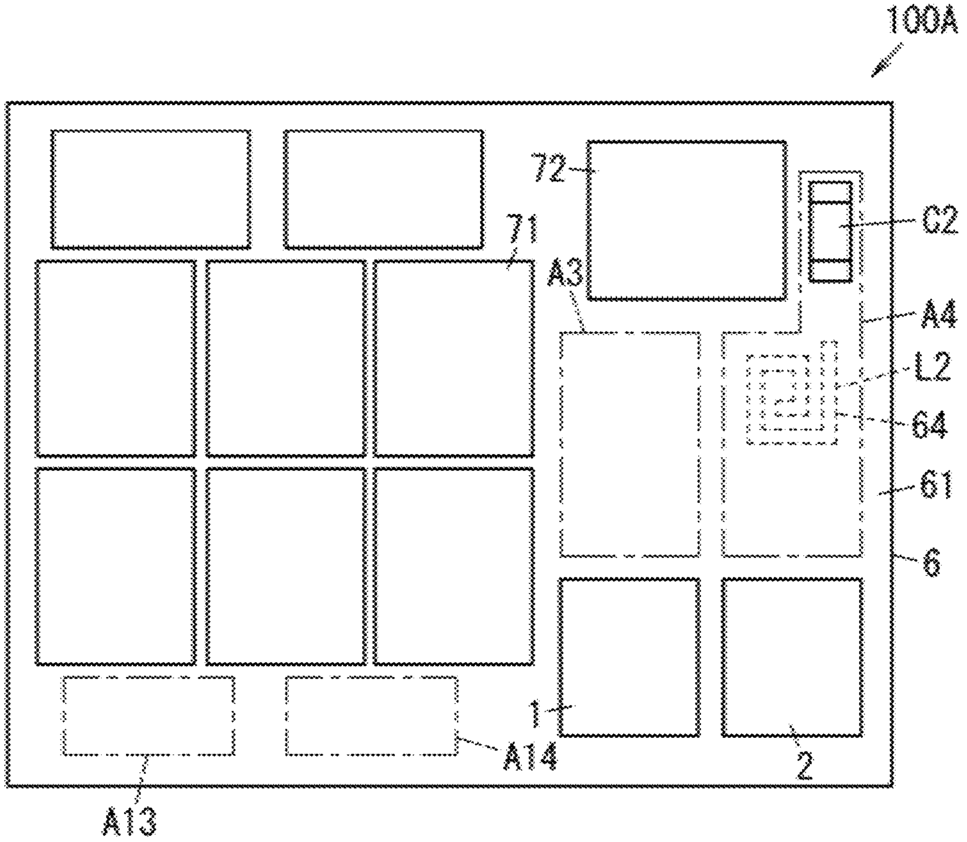
FIG. 6 is a plan view of the radio frequency module according to Embodiment 2.
Figure 7:
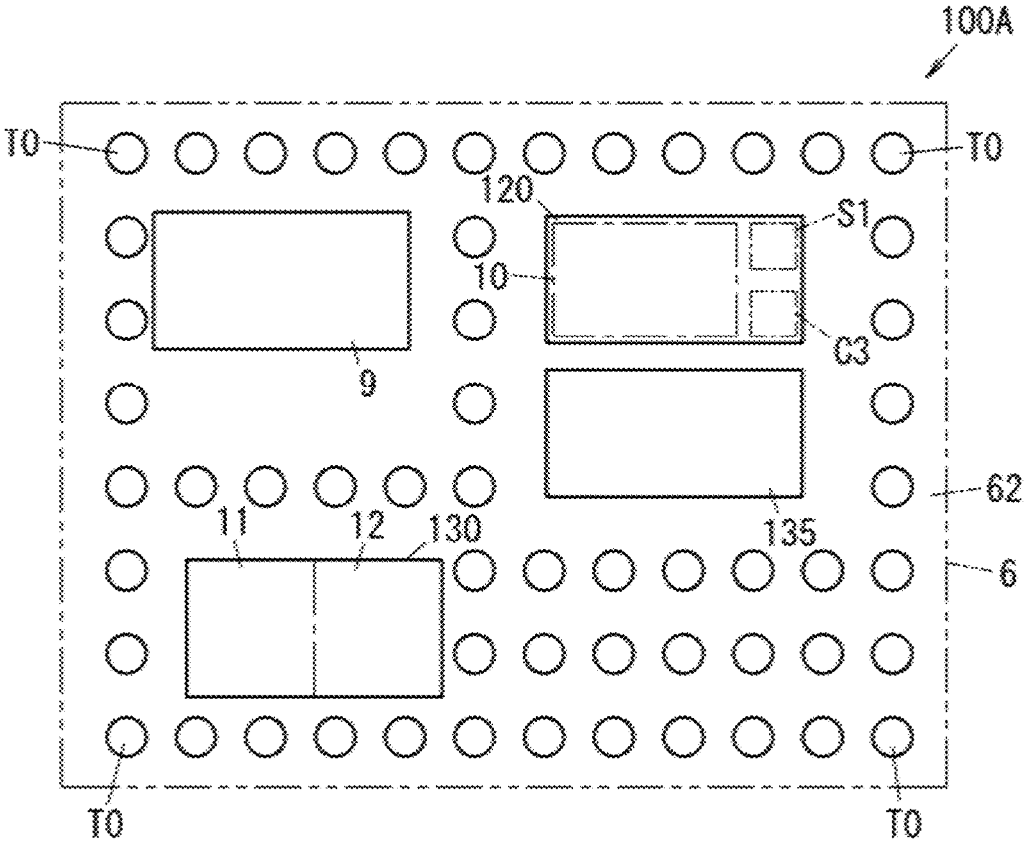
FIG. 7 is a plan view viewed through from a side of a first main surface of a module substrate to a side of a second main surface, relating to the radio frequency module according to Embodiment 2.

As shown in FIGS. 6 and 7, the radio frequency module 100A according to Embodiment 2 includes the module substrate 6, the plurality of first electronic components disposed on the first main surface 61 of the module substrate 6, and the plurality of second electronic components disposed on the second main surface 62 of the module substrate 6. The plurality of first electronic components include the first power amplifier 1, the second power amplifier 2, the first duplexer 71, the second duplexer 72, the plurality of circuit elements of the first output matching circuit 3 (see FIG. 5), the inductor L1, the capacitor C1, and the capacitor C2 of the second output matching circuit 4 (see FIG. 5), one or more circuit elements included in the first input matching circuit 13, and one or more circuit elements included in the second input matching circuit 14. The plurality of second electronic components include an IC 120 (hereinafter, also referred to as a first IC 120), an IC 130 (hereinafter, also referred to as a second IC 130), an IC 135 (hereinafter, also referred to as a third IC 135), and the antenna switch 9.

In FIG. 6, one or more circuit elements included in the first input matching circuit 13 are not shown, and an area A13, in which one or more circuit elements included in the first input matching circuit 13 are disposed on the first main surface 61 of the module substrate 6, is shown by one-dot chain line. In addition, in FIG. 6, one or more circuit elements included in the second input matching circuit 14 are not shown, and an area A14, in which one or more circuit elements included in the second input matching circuit 14 are disposed on the first main surface 61 of the module substrate 6, is shown by one-dot chain line.

In addition, similarly to the radio frequency module 100 according to Embodiment 1, in the radio frequency module 100A according to Embodiment 2, the plurality of external connection terminals T0 are disposed on the second main surface 62 of the module substrate 6.

In addition, similarly to the radio frequency module 100 (see FIG. 4) according to Embodiment 1, the radio frequency module 100A according to Embodiment 2 further includes the first resin layer 16, the second resin layer 17, and the shield electrode layer 18. In FIG. 6, the first resin layer 16 (see FIG. 4) and the shield electrode layer 18 (see FIG. 4) are not shown. In addition, in FIG. 7, the second resin layer 17 (see FIG. 4) is not shown. In the radio frequency module 100A according to Embodiment 2, the second resin layer 17 covers the outer peripheral surface of each of the plurality of second electronic components and the side surface of each of the plurality of external connection terminals T0.

The first IC 120 includes the band select switch 10. In addition, the IC 120 includes the selection switch S1 and the capacitor C3 of the second output matching circuit 4.

The first IC 120 is, for example, a Si-based IC including an SOI substrate. A Si-based IC may include a silicon substrate instead of the SOI substrate.

In plan view from the thickness direction D1 (see FIG. 4) of the module substrate 6, the outer edge of the first IC 120 has a rectangular shape.

The second IC 130 includes the first low noise amplifier 11 and the second low noise amplifier 12. The third IC 135 includes the control circuit 5 (see FIG. 5).

Each of the second IC 130 and the third IC 135 is, for example, a Si-based IC including an SOI substrate. A Si-based IC may include a silicon substrate instead of the SOI substrate.

In plan view from the thickness direction D1 (see FIG. 4) of the module substrate 6, the outer edge of the second IC 130 has a rectangular shape.

(3) Structure of Communication Device

The communication device 300A includes a mother substrate, the radio frequency module 100A and the signal processing circuit 301 disposed on the mother substrate, the first antenna 311, and the second antenna 312.

(4) Effect

Similarly to the radio frequency module 100 according to Embodiment 1, in the radio frequency module 100A according to Embodiment 2, the second output matching circuit 4 includes the capacitor C2, the inductor L2, and the capacitor C3 connected in series between the second transmission path Tx2 and a ground, and the selection switch S1 connected in parallel to the capacitor C3, and the capacitance of the capacitor C2 is larger than the capacitance of the second capacitor C3. As a result, the radio frequency module 100A according to Embodiment 2 can achieve size reduction while harmonic wave noise is suppressed.

In addition, the radio frequency module 100A according to Embodiment 2 includes the second low noise amplifier 12 connected to the second reception path Rx2, but it is difficult for the harmonic wave noise outputted from the first power amplifier 1 to reach the second low noise amplifier 12, so that a decrease in receiving sensitivity can be suppressed.

In addition, in the radio frequency module 100A according to Embodiment 2, since the IC 120 includes the band select switch 10 connected to the output terminal of the first power amplifier 1, it is possible to achieve size reduction in a configuration including the band select switch 10.

Embodiment 3

A radio frequency module 100B according to Embodiment 3 will be described with reference to FIGS. 8 to 10. Regarding the radio frequency module 100B according to Embodiment 3, the same components as the radio frequency module 100 (see FIGS. 1 to 4) according to Embodiment 1 are attached with the same reference numerals, and the description thereof will be omitted. In addition, regarding a radio frequency system 200B including the radio frequency module 100B, the same components as the radio frequency system 200 (see FIG. 1) according to Embodiment 1 are attached with the same reference numerals, and the description thereof is omitted. In addition, regarding a communication device 300B including the radio frequency system 200B, the same components as the communication device 300 (see FIG. 1) according to Embodiment 1 are attached with the same reference numerals, and the description thereof is omitted.

(1) Circuit Configuration of Radio Frequency Module, Radio Frequency System and Communication Device Hereinafter, the circuit configurations of the radio frequency module 100B, the radio frequency system 200B, and the communication device 300B according to Embodiment 3 will be described with reference to the drawings.

Figure 8:
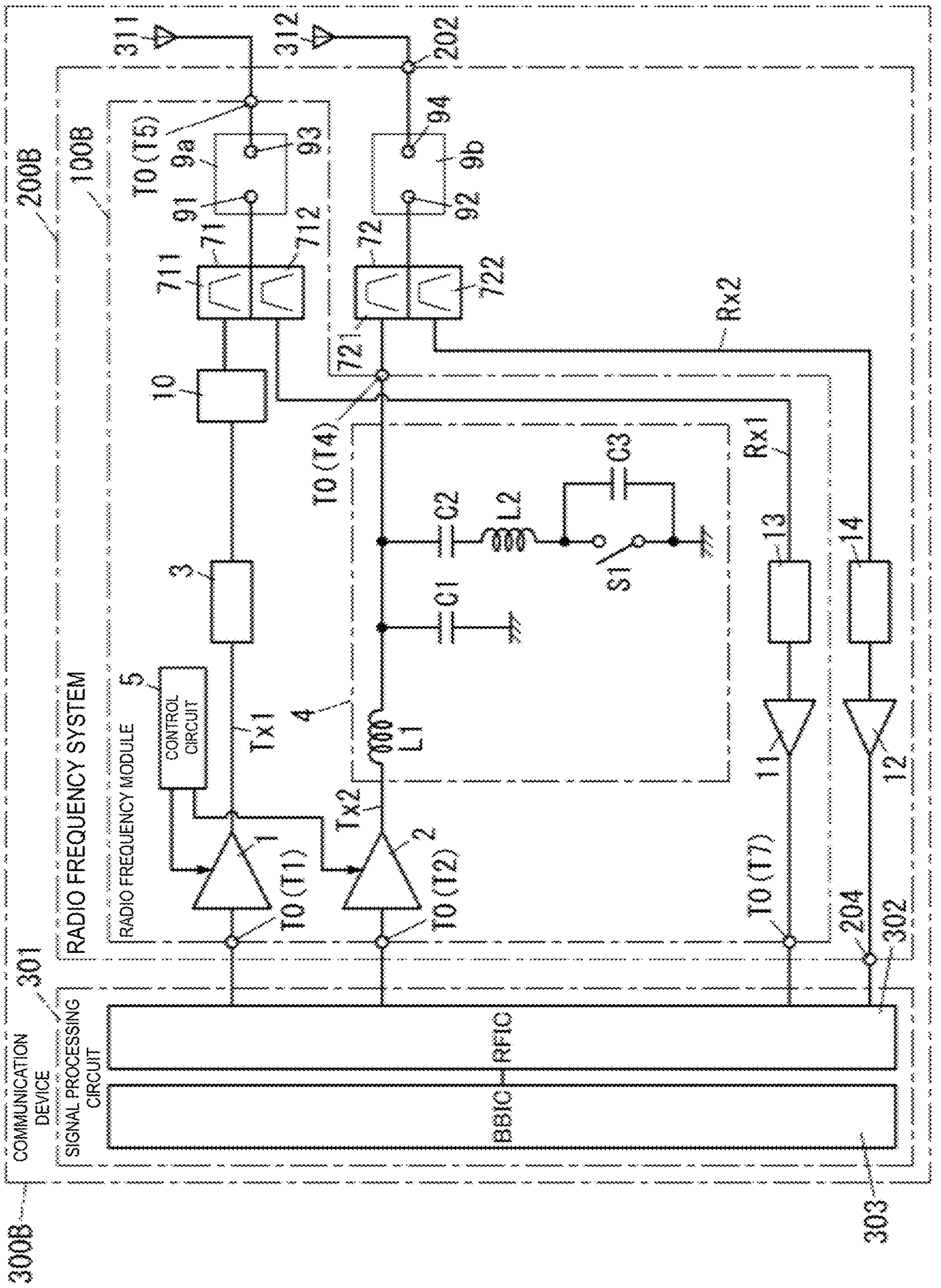
FIG. 8 is a circuit diagram of a radio frequency module according to Embodiment 3.

(1.1) Circuit Configuration of Radio Frequency Module and Radio Frequency System As shown in FIG. 8, the radio frequency system 200B includes the radio frequency module 100B, the second duplexer 72, a switch 9*b* (hereinafter, also referred to as an antenna switch 9*b*), the second low noise amplifier 12, the second input matching circuit 14, the second antenna terminal 202, and the second external output terminal 204. The antenna switch 9*b* includes a portion of the antenna switch 9 in the radio frequency system 200 according to Embodiment 1. The circuit configuration of the radio frequency system 200B is substantially the same as the circuit configuration of the radio frequency system 200, and is different in that the switch 9 (the antenna switch 9) is divided into two switches 9*a* and 9*b* (antenna switches 9*a* and 9*b*).

Similarly to the radio frequency module 100 (see FIG. 1) according to Embodiment 1, the radio frequency module 100B according to Embodiment 3 includes the first power amplifier 1, the second power amplifier 2, the first output matching circuit 3, the second output matching circuit 4, and the control circuit 5.

The radio frequency module 100B according to Embodiment 3 is different from the radio frequency module 100 according to Embodiment 1 in that the band select switch 10, the first duplexer 71, the antenna switch 9*a*, the first low noise amplifier 11, and the first input matching circuit 13 are further included. The antenna switch 9*a* includes a portion of the antenna switch 9 in the radio frequency system 200 according to Embodiment 1.

The antenna switch 9*a* includes the first terminal 91 and the third terminal 93 of the antenna switch 9 in the radio frequency system 200 according to Embodiment 1. The input and output terminal of the first duplexer 71 is connected to the first terminal 91 of the antenna switch 9*a*. The first antenna terminal T5 is connected to the third terminal 93 of the antenna switch 9*a*.

In addition, the radio frequency module 100B is different from the radio frequency module 100 according to Embodiment 1 in that the plurality of external connection terminals T0 further include the first antenna terminal T5 and the first signal output terminal T7. The plurality of external connection terminals T0 in the radio frequency module 100B according to Embodiment 3 do not include the first signal output terminal T3 among the plurality of external connection terminals T0 of the radio frequency module 100 according to Embodiment 1.

The first antenna terminal T5 is connected to the third terminal 93 of the antenna switch 9*a*. The first antenna terminal T5 is connected to, for example, the first antenna 311 of the communication device 300B.

The first signal output terminal T7 is connected to the output terminal of the first low noise amplifier 11. The first signal output terminal T7 is connected to, for example, the signal processing circuit 301 of the communication device 300B.

In the radio frequency module 100B, the third terminal 93 and the first antenna terminal T5 are not limited to being connected to each other without other circuit elements interposed therebetween, and may be connected to each other, for example, via a low pass filter and a coupler.

(1.2) Circuit Configuration of Communication Device

As shown in FIG. 8, the communication device 300B includes the radio frequency system 200B, the signal processing circuit 301, the first antenna 311, and the second antenna 312.

The first antenna 311 transmits a first transmission signal that is amplified by the first power amplifier 1 and outputted from the first antenna terminal T5.

The second antenna 312 transmits a second transmission signal that is amplified by the second power amplifier 2 and outputted from the second antenna terminal 202.

The signal processing circuit 301 includes the RF signal processing circuit 302 and a baseband signal processing circuit 303. The RF signal processing circuit 302 performs signal processing on a radio frequency signal. The RF signal processing circuit 302, for example, performs signal processing, such as upconverting, on a radio frequency signal (transmission signal) outputted from the baseband signal processing circuit 303, and outputs the radio frequency signal on which the signal processing is performed. In addition, the RF signal processing circuit 302, for example, performs signal processing, such as down conversion, on a radio frequency signal (reception signal) outputted from the radio frequency system 200B, and outputs the radio frequency signal on which the signal processing is performed to the baseband signal processing circuit 303.

(2) Structure of Radio Frequency Module

Figure 9:
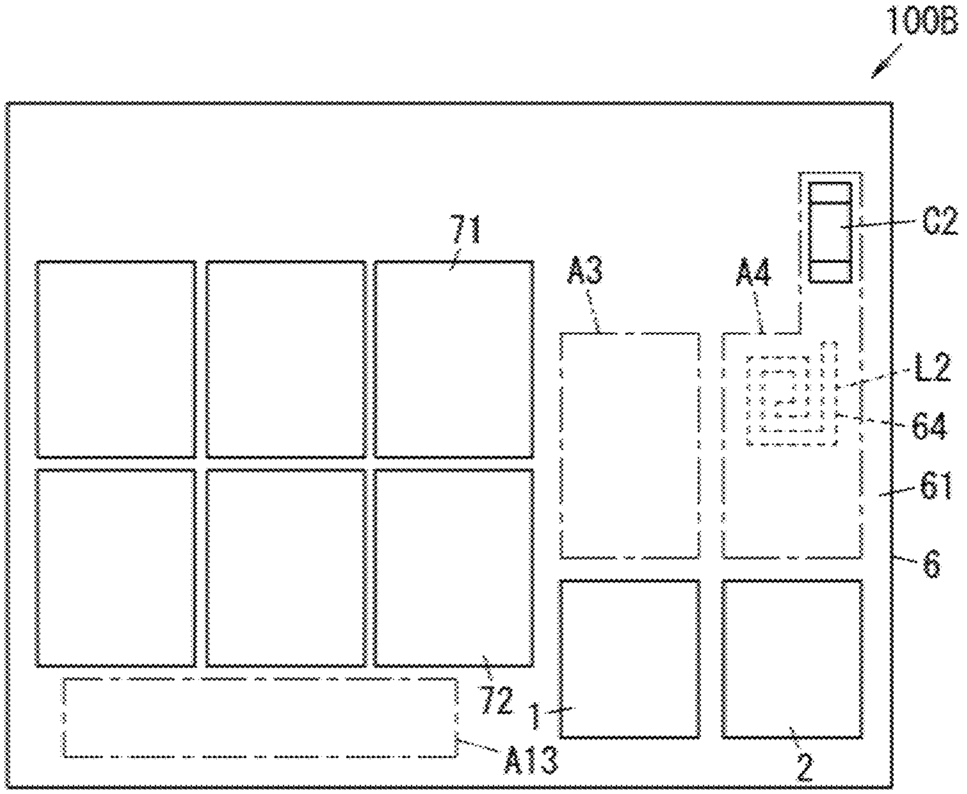
FIG. 9 is a plan view of the radio frequency module according to Embodiment 3.
Figure 10:
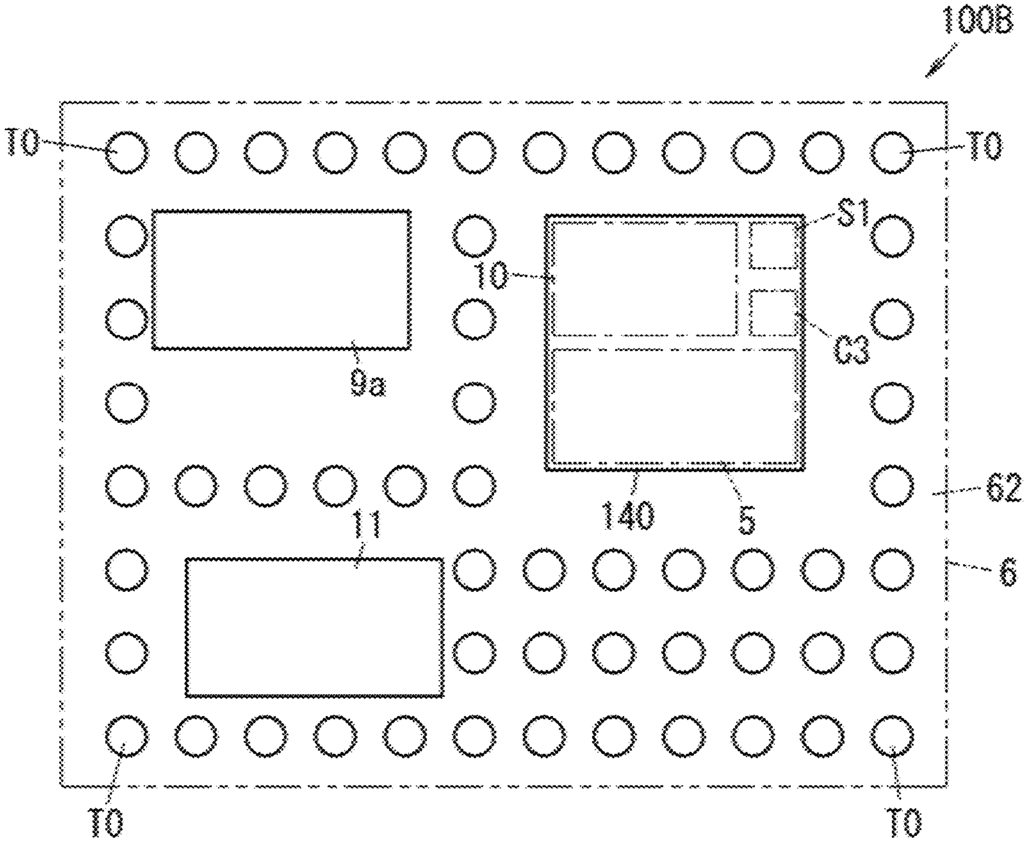
FIG. 10 is a plan view viewed through from a side of a first main surface of a module substrate to a side of a second main surface, relating to the radio frequency module according to Embodiment 3.

As shown in FIGS. 9 and 10, the radio frequency module 100B according to Embodiment 3 includes the module substrate 6, the plurality of first electronic components disposed on the first main surface 61 of the module substrate 6, and the plurality of second electronic components disposed on the second main surface 62 of the module substrate 6. The plurality of first electronic components include the first power amplifier 1, the second power amplifier 2, the first duplexer 71, the plurality of circuit elements of the first output matching circuit 3 (see FIG. 8), the inductor L1, the capacitor C1, and the capacitor C2 of the second output matching circuit 4 (see FIG. 8), and one or more circuit elements included in the first input matching circuit 13. The plurality of second electronic components include an IC 140, the antenna switch 9*a*, and the first low noise amplifier 11. In addition, similarly to the radio frequency module 100 according to Embodiment 1, in the radio frequency module 100B according to Embodiment 3, the plurality of external connection terminals T0 are disposed on the second main surface 62 of the module substrate 6.

In FIG. 9, one or more circuit elements included in the first input matching circuit 13 are not shown, and the area A13, in which one or more circuit elements included in the first input matching circuit 13 are disposed on the first main surface 61 of the module substrate 6, is shown by one-dot chain line.

In addition, similarly to the radio frequency module 100 (see FIG. 4) according to Embodiment 1, the radio frequency module 100B according to Embodiment 3 further includes the first resin layer 16, the second resin layer 17, and the shield electrode layer 18. In FIG. 9, the first resin layer 16 (see FIG. 4) and the shield electrode layer 18 (see FIG. 4) are not shown. In addition, in FIG. 10, the second resin layer 17 (see FIG. 4) is not shown. In the radio frequency module 100B according to Embodiment 3, the second resin layer 17 covers the outer peripheral surface of each of the plurality of second electronic components and the side surface of each of the plurality of external connection terminals T0.

The IC 140 includes the band select switch 10 and the control circuit 5. In addition, the IC 140 includes the selection switch S1 and the capacitor C3 of the second output matching circuit 4.

The IC 140 is, for example, a Si-based IC including an SOI substrate. A Si-based IC may include a silicon substrate instead of the SOI substrate.

In plan view from the thickness direction D1 (see FIG. 4) of the module substrate 6, the outer edge of the IC 140 has a rectangular shape.

Each of the second low noise amplifier 12 and the antenna switch 9*a* is, for example, a Si-based IC including an SOI substrate, but may include a silicon substrate instead of the SOI substrate.

(3) Structure of Radio Frequency System

The radio frequency system 200B includes a mother substrate (not shown) and a plurality of electronic components disposed on the mother substrate. The mother substrate is, for example, a printed wiring board. The plurality of electronic components include the radio frequency module 100B, the second duplexer 72, the antenna switch 9*b* that is a remaining portion of the antenna switch 9, the second low noise amplifier 12, and a circuit element of the second input matching circuit 14.

(4) Structure of Communication Device

The communication device 300B includes the radio frequency system 200B, the signal processing circuit 301 disposed on a mother substrate of the radio frequency system 200B, the first antenna 311, and the second antenna 312. The communication device 300B may include a second mother substrate on which the radio frequency system 200B and the signal processing circuit 301 are disposed, separately from a first mother substrate that is the mother substrate of the radio frequency system 200B.

(5) Effect

Similarly to the radio frequency module 100 according to Embodiment 1, in the radio frequency module 100B according to Embodiment 3, the second output matching circuit 4 includes the capacitor C2, the inductor L2, and the capacitor C3 connected in series between the second transmission path Tx2 and a ground, and the selection switch S1 connected in parallel to the capacitor C3, and the capacitance of the capacitor C2 is larger than the capacitance of the second capacitor C3. As a result, the radio frequency module 100B according to Embodiment 3 can achieve size reduction while harmonic wave noise is suppressed.

Embodiment 4

Figure 11:
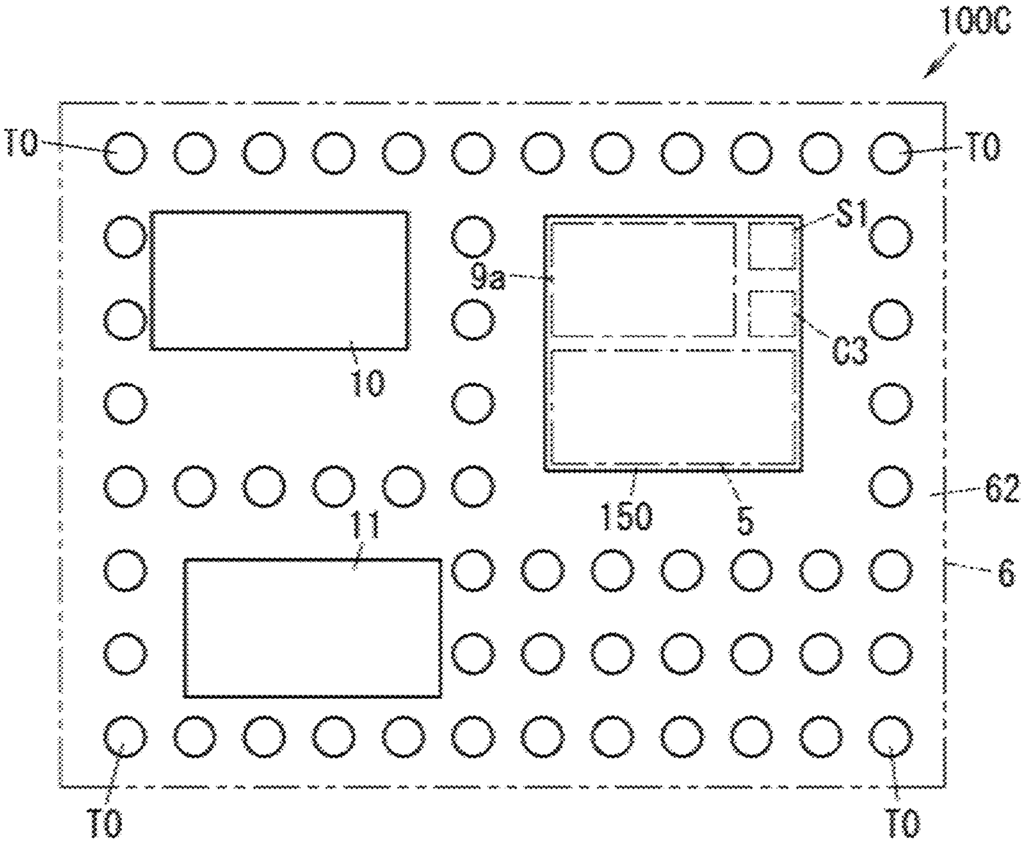
FIG. 11 is a plan view viewed through from a side of a first main surface of a module substrate to a side of a second main surface, relating to a radio frequency module according to Embodiment 4.

A radio frequency module 100C according to Embodiment 4 will be described with reference to FIG. 11.

(1) Circuit Configuration of Radio Frequency Module

Since the circuit configuration of the radio frequency module 100C according to Embodiment 4 is the same as the circuit configuration of the radio frequency module 100B (see FIG. 8) according to Embodiment 3, the illustration and description are omitted.

(2) Structure of Radio Frequency Module

Regarding the structure of the radio frequency module 100C according to Embodiment 4, the same structure as the structure of the radio frequency module 100B (FIGS. 9 and 10) according to Embodiment 3 is attached with the same reference numerals, and the description thereof is appropriately omitted.

In the radio frequency module 100C according to Embodiment 4, the plurality of second electronic components disposed on the second main surface 62 of the module substrate 6 include the band select switch 10, the IC 150, and the first low noise amplifier 11.

The IC 150 includes the control circuit 5 and the antenna switch 9*a*. In addition, the IC 150 includes the selection switch S1 and the capacitor C3 of the second output matching circuit 4 (see FIG. 8).

The IC 150 is, for example, a Si-based IC including an SOI substrate. A Si-based IC may include a silicon substrate instead of the SOI substrate.

In plan view from the thickness direction D1 (see FIG. 4) of the module substrate 6, the outer edge of the IC 150 has a rectangular shape.

(3) Effect

Similarly to the radio frequency module 100B according to Embodiment 3, in the radio frequency module 100C according to Embodiment 4, the second output matching circuit 4 includes the capacitor C2, the inductor L2, and the capacitor C3 connected in series between the second transmission path Tx2 and a ground, and the selection switch S1 connected in parallel to the capacitor C3, and the capacitance of the capacitor C2 is larger than the capacitance of the second capacitor C3. As a result, the radio frequency module 100C according to Embodiment 4 can achieve size reduction while harmonic wave noise is suppressed.

Embodiment 5

Figure 12:
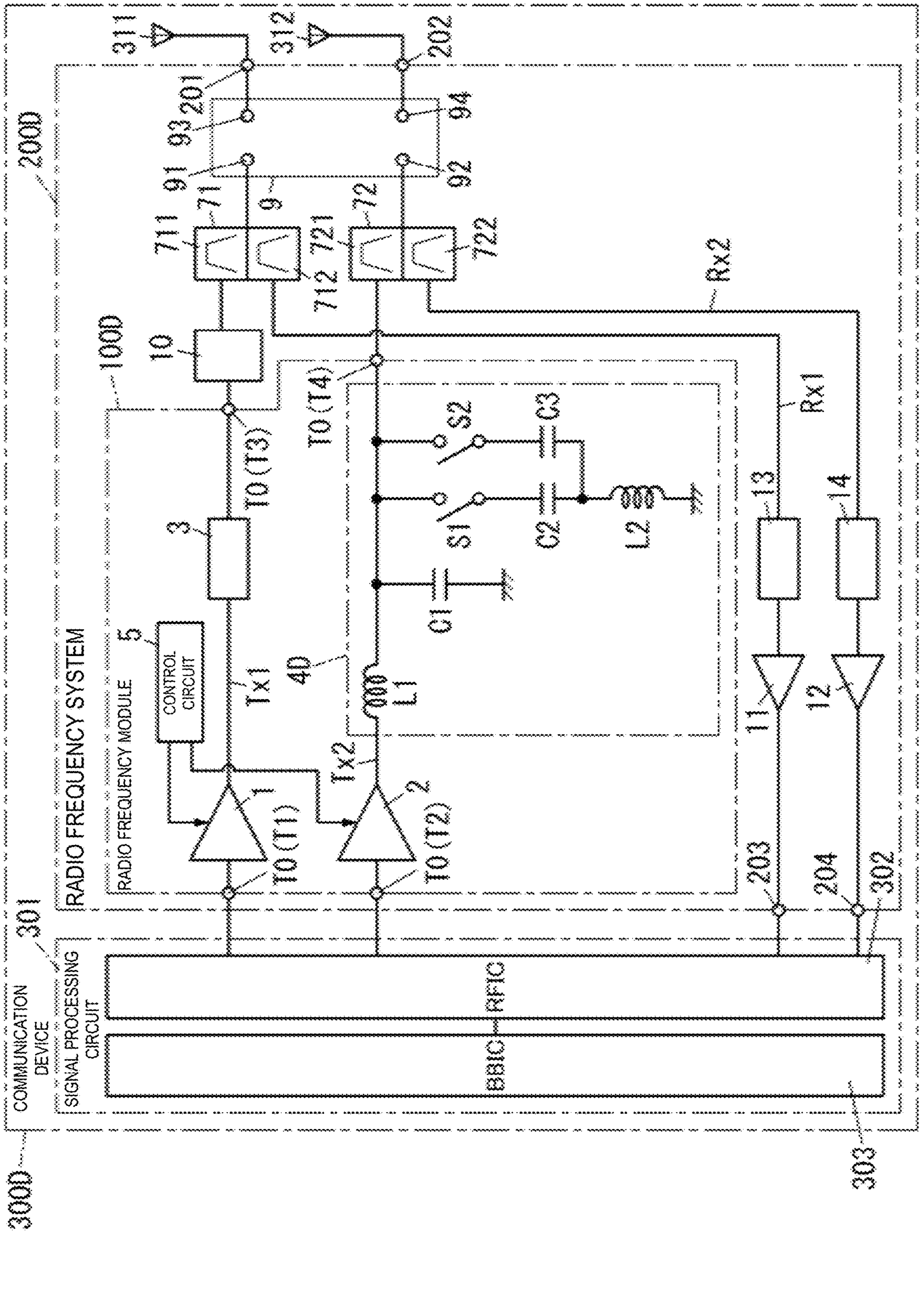
FIG. 12 is a circuit diagram of a radio frequency module according to Embodiment 5.

A radio frequency module 100D according to Embodiment 5 will be described with reference to FIG. 12. Regarding the radio frequency module 100D according to Embodiment 5, the same components as the radio frequency module 100 (see FIGS. 1 to 4) according to Embodiment 1 are attached with the same reference numerals, and the description thereof will be omitted. In addition, regarding a radio frequency system 200D including the radio frequency module 100D, the same components as the radio frequency system 200 (see FIG. 1) according to Embodiment 1 are attached with the same reference numerals, and the description thereof is omitted. In addition, regarding a communication device 300D including the radio frequency system 200D, the same components as the communication device 300 (see FIG. 1) according to Embodiment 1 are attached with the same reference numerals, and the description thereof is omitted.

(1) Circuit Configuration of Radio Frequency Module, Radio Frequency System and Communication Device The radio frequency system 200D according to Embodiment 5 includes the radio frequency module 100D instead of the radio frequency module 100 in the radio frequency system 200 (see FIG. 1) according to Embodiment 1.

Similarly to the radio frequency module 100 according to Embodiment 1, the radio frequency module 100D according to Embodiment 5 includes the first power amplifier 1, the second power amplifier 2, the first output matching circuit 3, and the control circuit 5.

In addition, the radio frequency module 100D according to Embodiment 5 includes a second output matching circuit 4D instead of the second output matching circuit 4 in the radio frequency module 100 according to Embodiment 1.

The second output matching circuit 4D includes the plurality of (two in the example of FIG. 12) inductors L1 and L2, the plurality of (three in the example of FIG. 12) capacitors C1, C2, and C3, and a plurality of (two in the example of FIG. 12) selection switches S1 and S2.

The inductor L1 is provided in a second transmission path Tx2 and is connected to a connection between the output terminal of the second power amplifier 2 and the second signal output terminal T4.

The capacitor C1 is connected between the path between the inductor L1 and the second signal output terminal T4 in the second transmission path Tx2 and a ground.

The selection switch S1, the capacitor C2, and the inductor L2 are connected in series between the second transmission path Tx2 and a ground. Here, the selection switch S1, the capacitor C2, and the inductor L2 are connected in series between the path between the inductor L1 and the second signal output terminal T4 in the second transmission path Tx2 and a ground. More specifically, a first end of the selection switch S1 is connected to the path between the inductor L1 and the second signal output terminal T4 in the second transmission path Tx2, a second end of the selection switch S1 is connected to one end of the capacitor C2, the other end of the capacitor C2 is connected to one end of the inductor L2, and the other end of the inductor L2 is connected to a ground. In addition, the selection switch S2 and the capacitor C3 are connected in series between the path between the inductor L1 and the second signal output terminal T4 in the second transmission path Tx2 and one end of the inductor L2. Here, the selection switch S2 and the capacitor C3 are connected in series between the path between the inductor L1 and the second signal output terminal T4 in the second transmission path Tx2 and one end of the inductor L2. More specifically, a first end of the selection switch S2 is connected to the path between the inductor L1 and the second signal output terminal T4 in the second transmission path Tx2, a second end of the selection switch S2 is connected to one end of the capacitor C3, and the other end of the capacitor C3 is connected to one end of the inductor L2.

In the second output matching circuit 4D, the capacitance of the capacitor C2 connected in series to the selection switch S1 is different from the capacitance of the capacitor C3 connected in series to the selection switch S2. As an example, the capacitance of the capacitor C2 is larger than the capacitance of the capacitor C3. In the second output matching circuit 4D, for example, the capacitance of the capacitor C2 is 100 pF, and the capacitance of the capacitor C3 is 0.1 pF.

Each of the plurality of selection switches S1 and S2 is, for example, a MOSFET. The selection switches S1 and S2 are controlled by, for example, the control circuit 5. The second output matching circuit 4D switches between the impedance matching function and the harmonic wave suppression function of reducing the harmonic wave noise outputted from the first power amplifier 1 by switching the states of the selection switches S1 and S2. The state of the selection switch S1 includes on (on state) and off (off state). In addition, the state of the selection switch S2 includes on (on state) and off (off state).

In the second output matching circuit 4D, assuming the second power amplifier 2 is configured to be operable, the selection switch S1 is controlled to be off by the control circuit 5, and the selection switch S2 is controlled to be on by the control circuit 5. That is, the selection switch S2 connected to the capacitor C3 having a relatively small capacitance among the capacitors C2 and C3 is controlled to be on, and the selection switch S1 connected to the capacitor C2 having a relatively large capacitance is controlled to be off. Accordingly, the second output matching circuit 4D has an impedance matching function of matching the impedance between the output terminal of the second power amplifier 2 and the second transmission filter 721 of the second duplexer 72.

In the second output matching circuit 4D, assuming the first power amplifier 1 is configured to be operable, the selection switch S1 is controlled to be on by the control circuit 5, and the selection switch S2 is controlled to be off by the control circuit 5. That is, the selection switch S1 connected to the capacitor C2 having a relatively large capacitance among the capacitors C2 and C3 is controlled to be on, and the selection switch S2 connected to the capacitor C3 having a relatively small capacitance is controlled to be off. Accordingly, the second output matching circuit 4D has a harmonic wave suppression function of reducing the harmonic wave noise outputted from the first power amplifier 1.

The communication device 300D includes the radio frequency module 100D instead of the radio frequency module 100 in the communication device 300 according to Embodiment 1.

(2) Structure of Radio Frequency Module

Since the structure of the radio frequency module 100D according to Embodiment 5 is substantially the same as the structure of the radio frequency module 100 according to Embodiment 1 (see FIGS. 2 to 4), the illustration and description are omitted. The radio frequency module 100D according to Embodiment 5 is different from the radio frequency module 100 in that the selection switches S1 and S2 are included in the IC 110 (see FIG. 3).

(3) Effect

In the radio frequency module 100D according to Embodiment 5, the second output matching circuit 4D switches between the impedance matching function and the harmonic wave suppression function of reducing the harmonic wave noise outputted from the first power amplifier 1 by switching the states of the selection switches S1 and S2.

As a result, the radio frequency module 100D according to Embodiment 5 can achieve size reduction while harmonic wave noise is suppressed.

Embodiment 6

Figure 13:
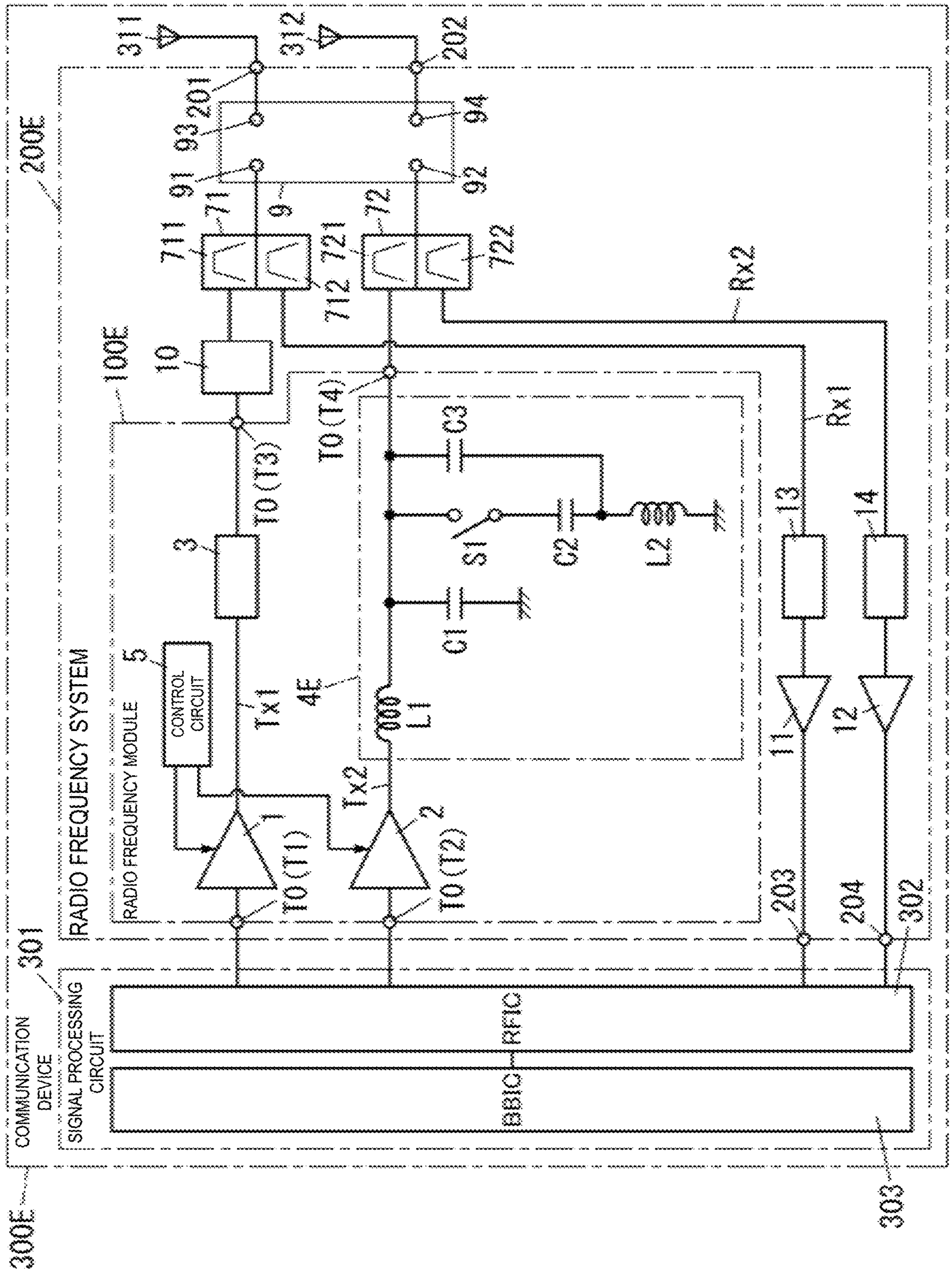
FIG. 13 is a circuit diagram of a radio frequency module according to Embodiment 6.

A radio frequency module 100E according to Embodiment 6 will be described with reference to FIG. 13. Regarding the radio frequency module 100E according to Embodiment 6, the same components as the radio frequency module 100 (see FIGS. 1 to 4) according to Embodiment 1 are attached with the same reference numerals, and the description thereof will be omitted. In addition, regarding a radio frequency system 200E including the radio frequency module 100E, the same components as the radio frequency system 200 (see FIG. 1) according to Embodiment 1 are attached with the same reference numerals, and the description thereof is omitted. In addition, regarding a communication device 300E including the radio frequency system 200, the same components as the communication device 300 (see FIG. 1) according to Embodiment 1 are attached with the same reference numerals, and the description thereof is (1) Circuit Configuration of Radio Frequency Module, Radio Frequency System and Communication Device The radio frequency system 200E according to Embodiment 6 includes the radio frequency module 100E instead of the radio frequency module 100 in the radio frequency system 200 (see FIG. 1) according to Embodiment 1.

Similarly to the radio frequency module 100 according to Embodiment 1, the radio frequency module 100E according to Embodiment 6 includes the first power amplifier 1, the second power amplifier 2, the first output matching circuit 3, and the control circuit 5.

In addition, the radio frequency module 100E according to Embodiment 6 includes a second output matching circuit 4E instead of the second output matching circuit 4 in the radio frequency module 100 according to Embodiment 1.

The second output matching circuit 4E includes the plurality of (two in the example of FIG. 13) inductors L1 and L2, the plurality of (three in the example of FIG. 13) capacitors C1, C2, and C3, and the selection switch S1.

The inductor L1 is provided in a second transmission path Tx2 and is connected to a connection between the output terminal of the second power amplifier 2 and the second signal output terminal T4.

The capacitor C1 is connected between the path between the inductor L1 and the second signal output terminal T4 in the second transmission path Tx2 and a ground.

The selection switch S1, the capacitor C2, and the inductor L2 are connected in series between the second transmission path Tx2 and a ground. Here, the selection switch S1, the capacitor C2, and the inductor L2 are connected in series between the path between the inductor L1 and the second signal output terminal T4 in the second transmission path Tx2 and a ground.

In addition, the capacitor C3 is connected in series between the path between the inductor L1 and the second signal output terminal T4 in the second transmission path Tx2 and one end of the inductor L2. Here, the capacitor C3 is connected in series between the path between the inductor L1 and the second signal output terminal T4 in the second transmission path Tx2 and one end of the inductor L2. More specifically, one end of the capacitor C3 is connected to the path between the inductor L1 and the second signal output terminal T4 in the second transmission path Tx2, and the other end of the capacitor C3 is connected to one end of the inductor L2. In other words, the capacitor C3 is connected in parallel to the series circuit of the selection switch S1 and the capacitor C2.

In the second output matching circuit 4E, the capacitance of the capacitor C2 connected in series to the selection switch S1 is different from the capacitance of the capacitor C3. As an example, the capacitance of the capacitor C2 is larger than the capacitance of the capacitor C3. In the second output matching circuit 4E, for example, the capacitance of the capacitor C2 is 100 pF, and the capacitance of the capacitor C3 is 0.1 pF.

The selection switch S1 is, for example, a MOSFET. The selection switch S1 is controlled by, for example, the control circuit 5. The second output matching circuit 4E switches between the impedance matching function and the harmonic wave suppression function of reducing harmonic wave noise outputted from the first power amplifier 1 by switching the state of the selection switch S1. The state of the selection switch S1 includes on and off.

In the second output matching circuit 4E, assuming the second power amplifier 2 is configured to be operable, the selection switch S1 is controlled to be off by the control circuit 5. Accordingly, the second output matching circuit 4E has an impedance matching function of matching the impedance between the output terminal of the second power amplifier 2 and the second transmission filter 721 of the second duplexer 72.

In the second output matching circuit 4E, assuming the first power amplifier 1 is configured to be operable, the selection switch S1 is controlled to be on by the control circuit 5. Accordingly, the second output matching circuit 4E has a harmonic wave suppression function of reducing the harmonic wave noise outputted from the first power amplifier 1.

The communication device 300E includes the radio frequency module 100E instead of the radio frequency module 100 in the communication device 300 according to Embodiment 1.

(2) Structure of Radio Frequency Module

Since the structure of the radio frequency module 100E according to Embodiment 6 is substantially the same as the structure of the radio frequency module 100 according to Embodiment 1 (see FIGS. 2 to 4), the illustration and description are omitted.

(3) Effect

In the radio frequency module 100E according to Embodiment 6, the second output matching circuit 4E switches between the impedance matching function and the harmonic wave suppression function of reducing the harmonic wave noise outputted from the first power amplifier 1 by switching the state of the selection switch S1. As a result, the radio frequency module 100E according to Embodiment 6 can achieve size reduction while harmonic wave noise is suppressed.

Embodiment 7

Figure 14:
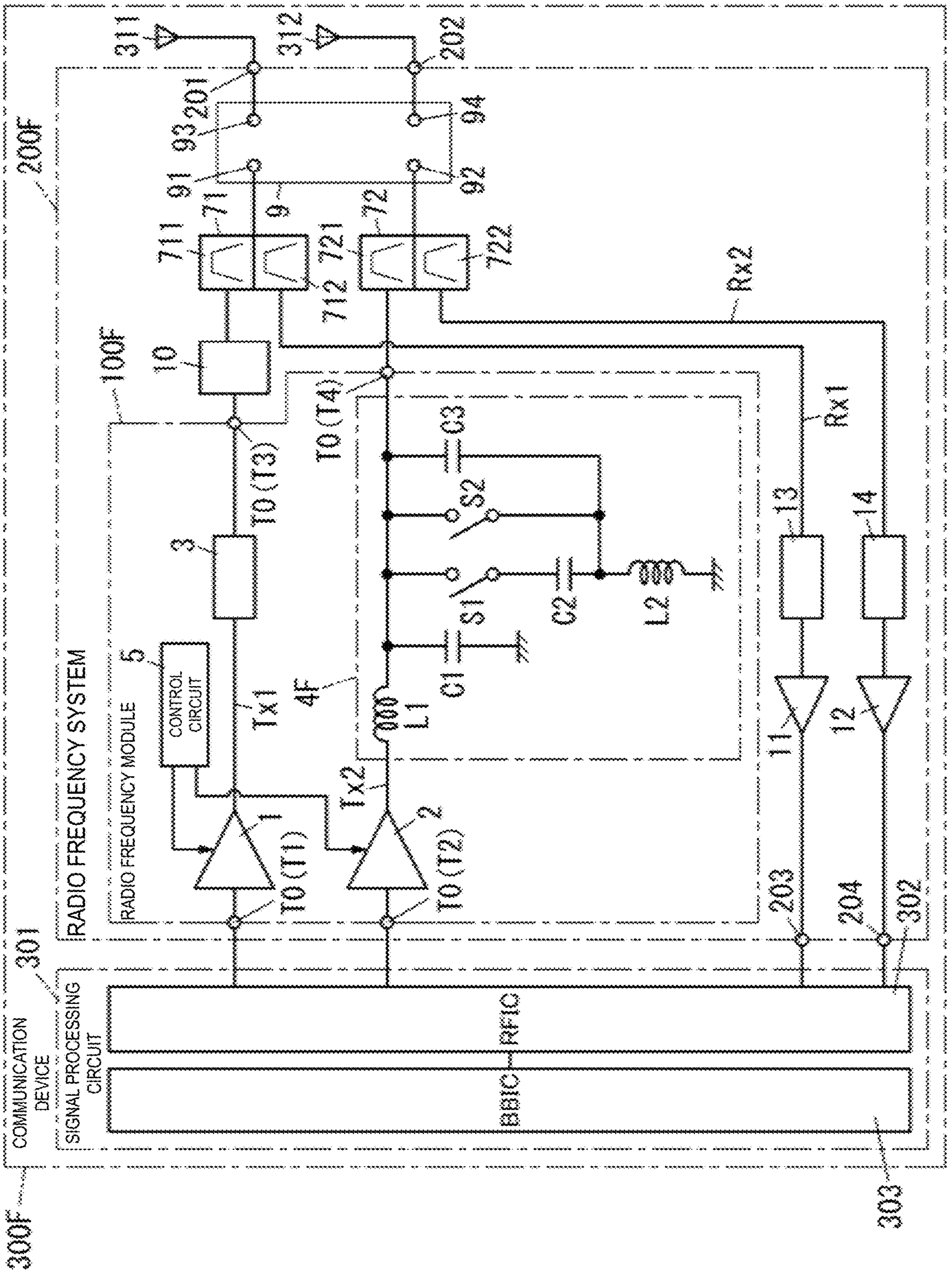
FIG. 14 is a circuit diagram of a radio frequency module according to Embodiment 7.

A radio frequency module 100F according to Embodiment 7 will be described with reference to FIG. 14. Regarding the radio frequency module 100F according to Embodiment 7, the same components as the radio frequency module 100 (see FIGS. 1 to 4) according to Embodiment 1 are attached with the same reference numerals, and the description thereof will be omitted. In addition, regarding a radio frequency system 200F including the radio frequency module 100F, the same components as the radio frequency system 200 (see FIG. 1) according to Embodiment 1 are attached with the same reference numerals, and the description thereof is omitted. In addition, regarding a communication device 300F including the radio frequency system 200F, the same components as the communication device 300 (see FIG. 1) according to Embodiment 1 are attached with the same reference numerals, and the description thereof is omitted.

(1) Circuit Configuration of Radio Frequency Module, Radio Frequency System and Communication Device The radio frequency system 200F according to Embodiment 7 includes the radio frequency module 100F instead of the radio frequency module 100 in the radio frequency system 200 (see FIG. 1) according to Embodiment 1.

Similarly to the radio frequency module 100 according to Embodiment 1, the radio frequency module 100F according to Embodiment 7 includes the first power amplifier 1, the second power amplifier 2, the first output matching circuit 3, and the control circuit 5.

In addition, the radio frequency module 100F according to Embodiment 7 includes a second output matching circuit 4F instead of the second output matching circuit 4 in the radio frequency module 100 according to Embodiment 1.

The second output matching circuit 4F includes the plurality of (two in the example of FIG. 14) inductors L1 and L2, the plurality of (three in the example of FIG. 14) capacitors C1, C2, and C3, and the plurality of (two in the example of FIG. 14) selection switches S1 and S2.

The inductor L1 is provided in the second transmission path Tx2 and is connected between the output terminal of the second power amplifier 2 and the second signal output terminal T4.

The capacitor C1 is connected between the path between the inductor L1 and the second signal output terminal T4 in the second transmission path Tx2 and a ground.

The selection switch S1, the capacitor C2, and the inductor L2 are connected in series between the second transmission path Tx2 and a ground. Here, the selection switch S1, the capacitor C2, and the inductor L2 are connected in series between the path between the inductor L1 and the second signal output terminal T4 in the second transmission path Tx2 and a ground. More specifically, a first end of the selection switch S1 is connected to the path between the inductor L1 and the second signal output terminal T4 in the second transmission path Tx2, a second end of the selection switch S1 is connected to one end of the capacitor C2, the other end of the capacitor C2 is connected to one end of the inductor L2, and the other end of the inductor L2 is connected to a ground.

In addition, the selection switch S2 is connected in series between the path between the inductor L1 and the second signal output terminal T4 in the second transmission path Tx2 and one end of the inductor L2. In other words, the selection switch S2 is connected in parallel to the series circuit of the selection switch S1 and the capacitor C2.

The capacitor C3 is connected in series between the path between the inductor L1 and the second signal output terminal T4 in the second transmission path Tx2 and one end of the inductor L2. In other words, the capacitor C3 is connected in parallel to the series circuit of the selection switch S1 and the capacitor C2.

In the second output matching circuit 4F, the capacitance of the capacitor C2 connected in series to the selection switch S1 is different from the capacitance of the capacitor C3. As an example, the capacitance of the capacitor C2 is larger than the capacitance of the capacitor C3. In the second output matching circuit 4F, for example, the capacitance of the capacitor C2 is 100 pF, and the capacitance of the capacitor C3 is 0.1 pF.

Each of the plurality of selection switches S1 and S2 is, for example, a MOSFET. The selection switches S1 and S2 are controlled by, for example, the control circuit 5. The second output matching circuit 4F switches between the impedance matching function and the harmonic wave suppression function of reducing harmonic wave noise output from the first power amplifier 1 by switching the states of the selection switches S1 and S2. The state of the selection switch S1 includes on and off. In addition, the state of the selection switch S2 includes on and off.

In the second output matching circuit 4F, assuming the second power amplifier 2 is configured to be operable, the selection switch S1 is controlled to be off by the control circuit 5, and the selection switch S2 is controlled to be on or off by the control circuit 5. Accordingly, the second output matching circuit 4D has an impedance matching function of matching the impedance between the output terminal of the second power amplifier 2 and the second transmission filter 721 of the second duplexer 72.

In the second output matching circuit 4F, assuming the first power amplifier 1 is configured to be operable, the selection switch S1 is controlled to be on by the control circuit 5, and the selection switch S2 is controlled to be off by the control circuit 5. Accordingly, the second output matching circuit 4F has a harmonic wave suppression function of reducing the harmonic wave noise outputted from the first power amplifier 1.

The communication device 300F includes the radio frequency module 100F instead of the radio frequency module 100 in the communication device 300 according to Embodiment 1.

(2) Structure of Radio Frequency Module

Since the structure of the radio frequency module 100F according to Embodiment 7 is substantially the same as the structure of the radio frequency module 100 according to Embodiment 1 (see FIGS. 2 to 4), the illustration and description are omitted. The radio frequency module 100F according to Embodiment 7 is different from the radio frequency module 100 in that the selection switches S1 and S2 are included in the IC 110 (see FIG. 3).

(3) Effect

In the radio frequency module 100F according to Embodiment 7, the second output matching circuit 4F switches between the impedance matching function and the harmonic wave suppression function of reducing the harmonic wave noise outputted from the first power amplifier 1 by switching the states of the selection switches S1 and S2. As a result, the radio frequency module 100F according to Embodiment 7 can achieve size reduction while harmonic wave noise is suppressed.

Embodiment 8

Figure 15:
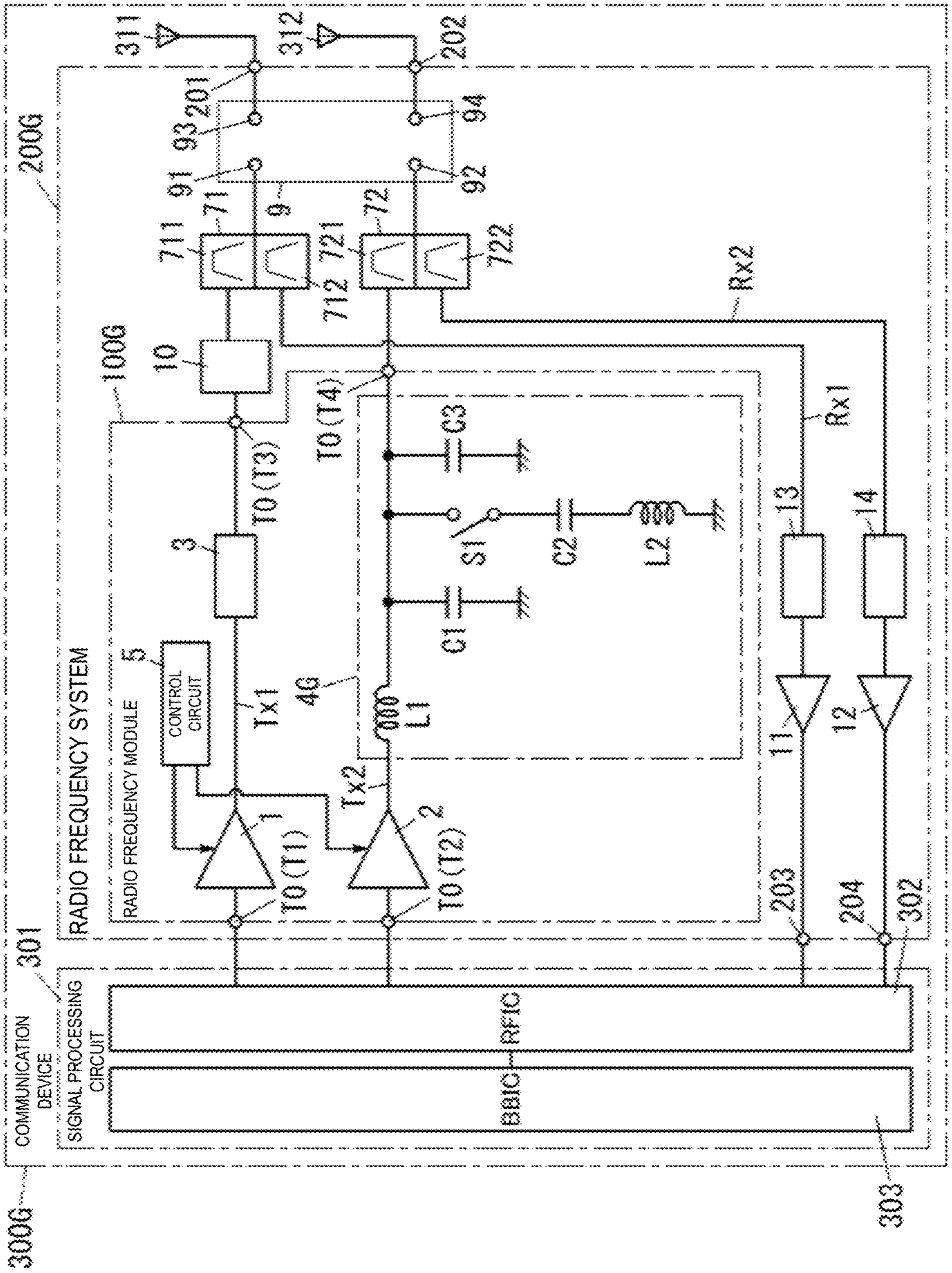
FIG. 15 is a circuit diagram of a radio frequency module according to Embodiment 8.

A radio frequency module 100G according to Embodiment 8 will be described with reference to FIG. 15. Regarding the radio frequency module 100G according to Embodiment 8, the same components as the radio frequency module 100 (see FIGS. 1 to 4) according to Embodiment 1 are attached with the same reference numerals, and the description thereof will be omitted. In addition, regarding a radio frequency system 200G including the radio frequency module 100G, the same components as the radio frequency system 200 (see FIG. 1) according to Embodiment 1 are attached with the same reference numerals, and the description thereof is omitted. In addition, regarding a communication device 300G including the radio frequency system 200G, the same components as the communication device 300 (see FIG. 1) according to Embodiment 1 are attached with the same reference numerals, and the description thereof is omitted.

(1) Circuit Configuration of Radio Frequency Module, Radio Frequency System and Communication Device The radio frequency system 200G according to Embodiment 8 includes the radio frequency module 100G instead of the radio frequency module 100 in the radio frequency system 200 (see FIG. 1) according to Embodiment 1.

Similarly to the radio frequency module 100 according to Embodiment 1, the radio frequency module 100G according to Embodiment 8 includes the first power amplifier 1, the second power amplifier 2, the first output matching circuit 3, and the control circuit 5.

In addition, the radio frequency module 100G according to Embodiment 8 includes a second output matching circuit 4G instead of the second output matching circuit 4 in the radio frequency module 100 according to Embodiment 1.

The second output matching circuit 4G includes the plurality of (two in the example of FIG. 15) inductors L1 and L2, the plurality of (three in the example of FIG. 15) capacitors C1, C2, and C3, and the selection switch S1.

The inductor L1 is provided in a second transmission path Tx2 and is connected to a connection between the output terminal of the second power amplifier 2 and the second signal output terminal T4.

The capacitor C1 is connected between the path between the inductor L1 and the second signal output terminal T4 in the second transmission path Tx2 and a ground.

The selection switch S1, the capacitor C2, and the inductor L2 are connected in series between the second transmission path Tx2 and a ground. Here, the selection switch S1, the capacitor C2, and the inductor L2 are connected in series between the path between the inductor L1 and the second signal output terminal T4 in the second transmission path Tx2 and a ground.

In addition, the capacitor C3 is connected between the path between the inductor L1 and the second signal output terminal T4 in the second transmission path Tx2 and a ground.

In the second output matching circuit 4G, the capacitance of the capacitor C2 connected in series to the selection switch S1 is different from the capacitance of the capacitor C3. As an example, the capacitance of the capacitor C2 is larger than the capacitance of the capacitor C3. In the second output matching circuit 4G, for example, the capacitance of the capacitor C2 is 100 pF, and the capacitance of the capacitor C3 is 0.1 pF.

The selection switch S1 is, for example, a MOSFET. The selection switch S1 is controlled by, for example, the control circuit 5. The second output matching circuit 4G switches between the impedance matching function and the harmonic wave suppression function of reducing harmonic wave noise outputted from the first power amplifier 1 by switching the state of the selection switch S1. The state of the selection switch S1 includes on and off.

In the second output matching circuit 4G, assuming the second power amplifier 2 is configured to be operable, the selection switch S1 is controlled to be off by the control circuit 5. Accordingly, the second output matching circuit 4G has an impedance matching function of matching the impedance between the output terminal of the second power amplifier 2 and the second transmission filter 721 of the second duplexer 72.

In the second output matching circuit 4G, assuming the first power amplifier 1 is configured to be operable, the selection switch S1 is controlled to be on by the control circuit 5. Accordingly, the second output matching circuit 4G has a harmonic wave suppression function of reducing the harmonic wave noise outputted from the first power amplifier 1.

The communication device 300G includes the radio frequency module 100G instead of the radio frequency module 100 in the communication device 300 according to Embodiment 1.

(2) Structure of Radio Frequency Module

Since the structure of the radio frequency module 100G according to Embodiment 8 is substantially the same as the structure of the radio frequency module 100 according to Embodiment 1 (see FIGS. 2 to 4), the illustration and description are omitted.

(3) Effect

In the radio frequency module 100G according to Embodiment 8, the second output matching circuit 4G switches between the impedance matching function and the harmonic wave suppression function of reducing the harmonic wave noise outputted from the first power amplifier 1 by switching the state of the selection switch S1. As a result, the radio frequency module 100G according to Embodiment 8 can achieve size reduction while harmonic wave noise is suppressed.

Embodiment 9

Figure 16:
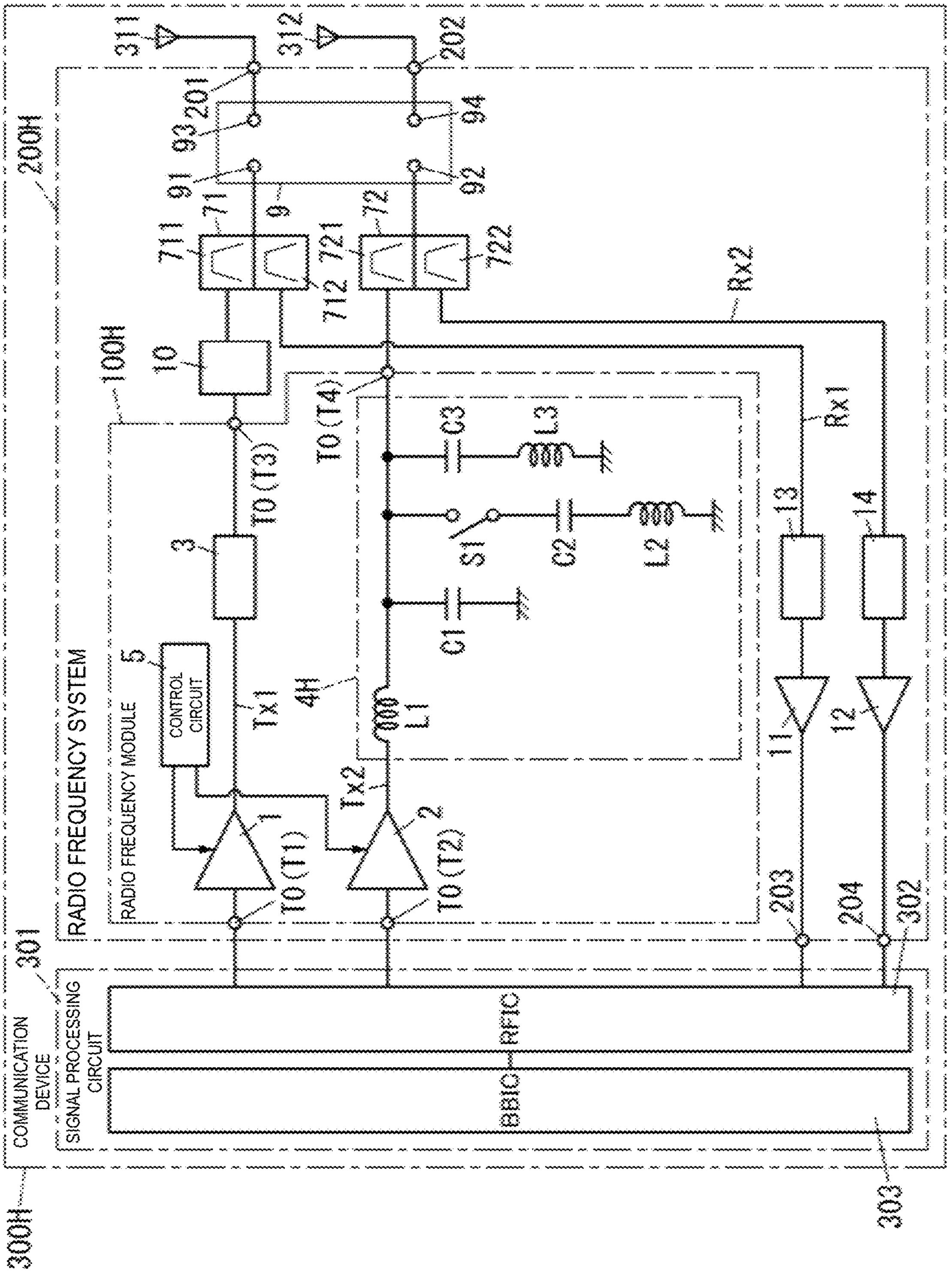
FIG. 16 is a circuit diagram of a radio frequency module according to Embodiment 9.
Figure 17:
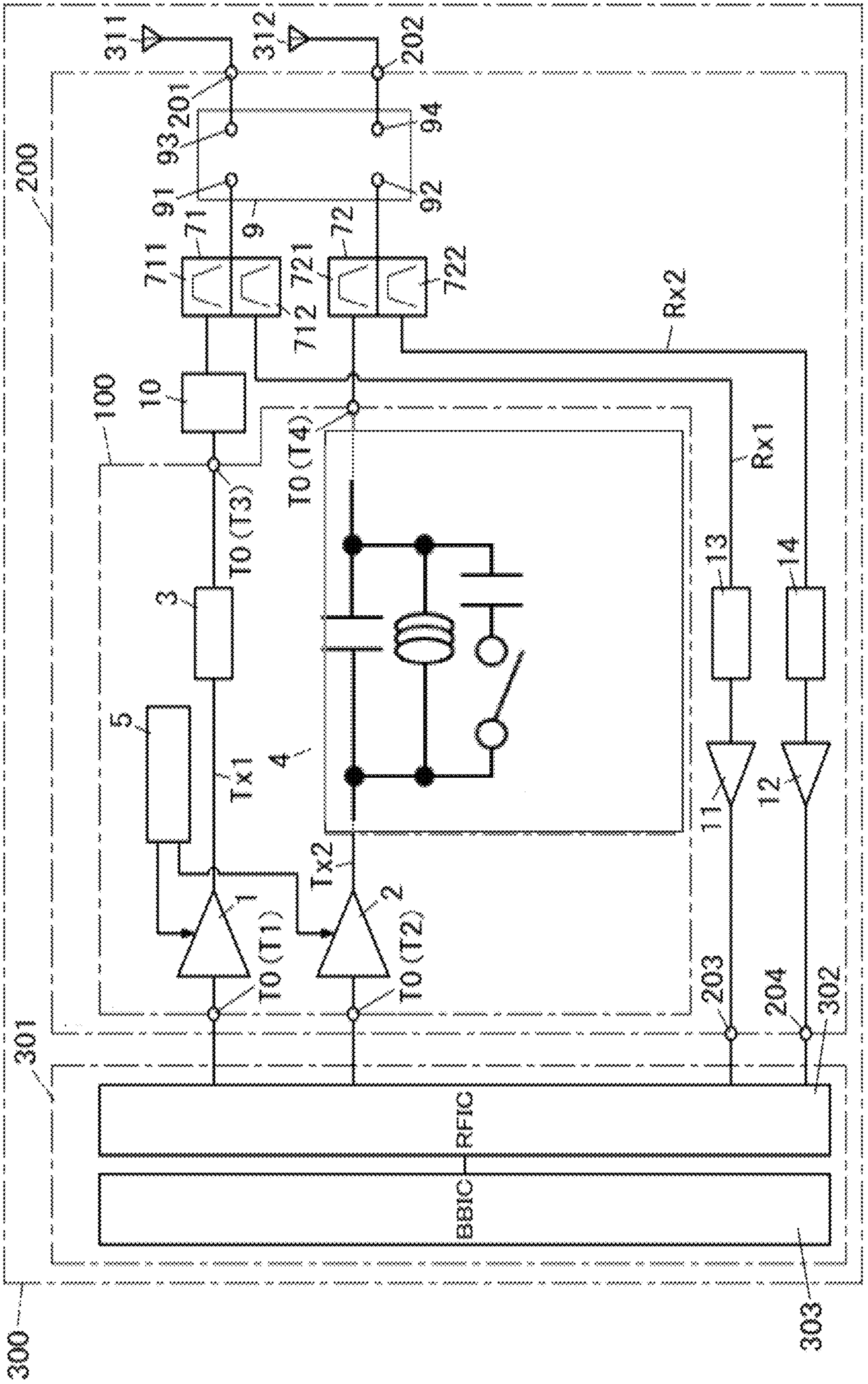
FIGS. 17-20 are circuit diagram of a radio frequency module according to Embodiments 10-13.
Figure 18:
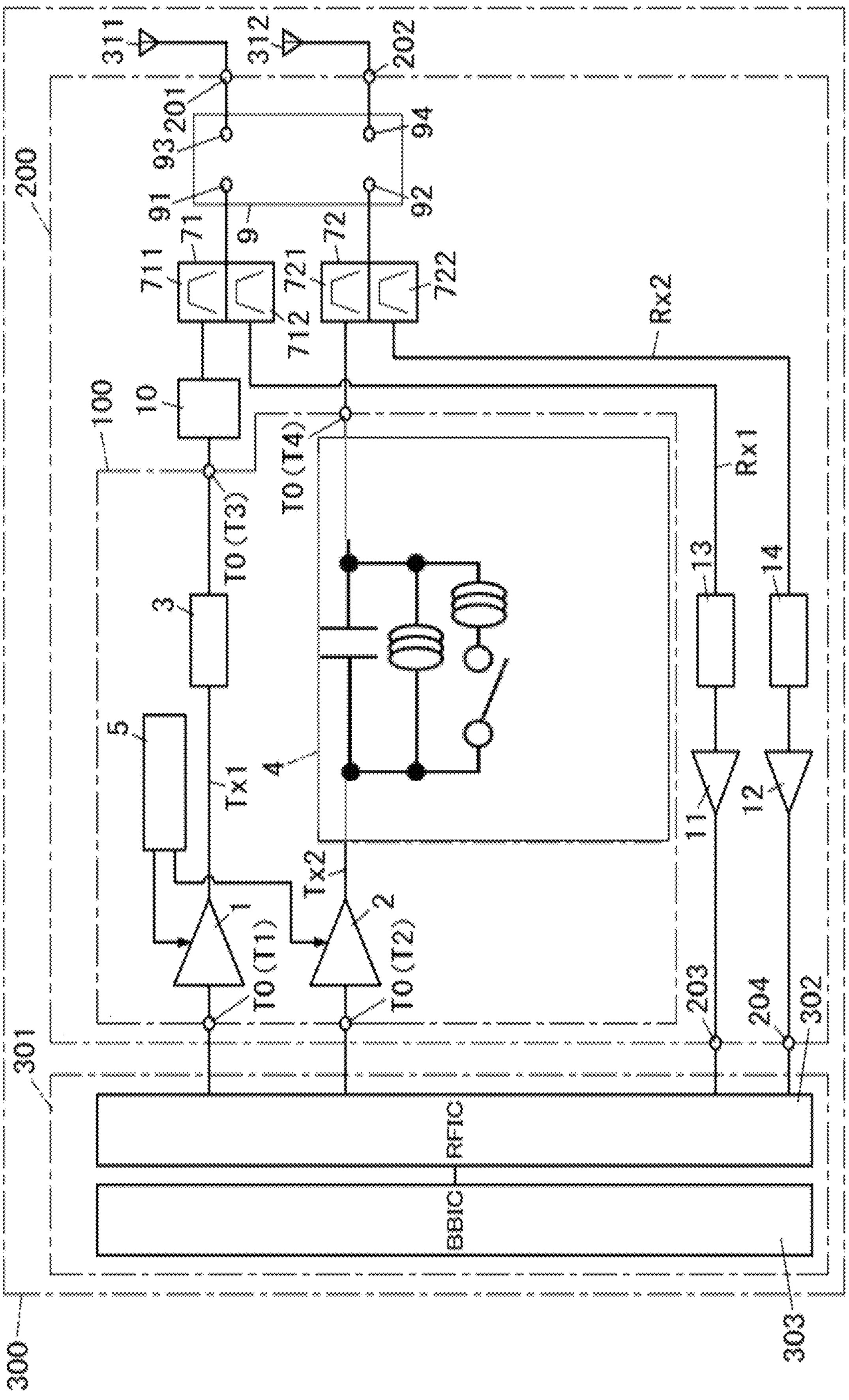
Figure 19:
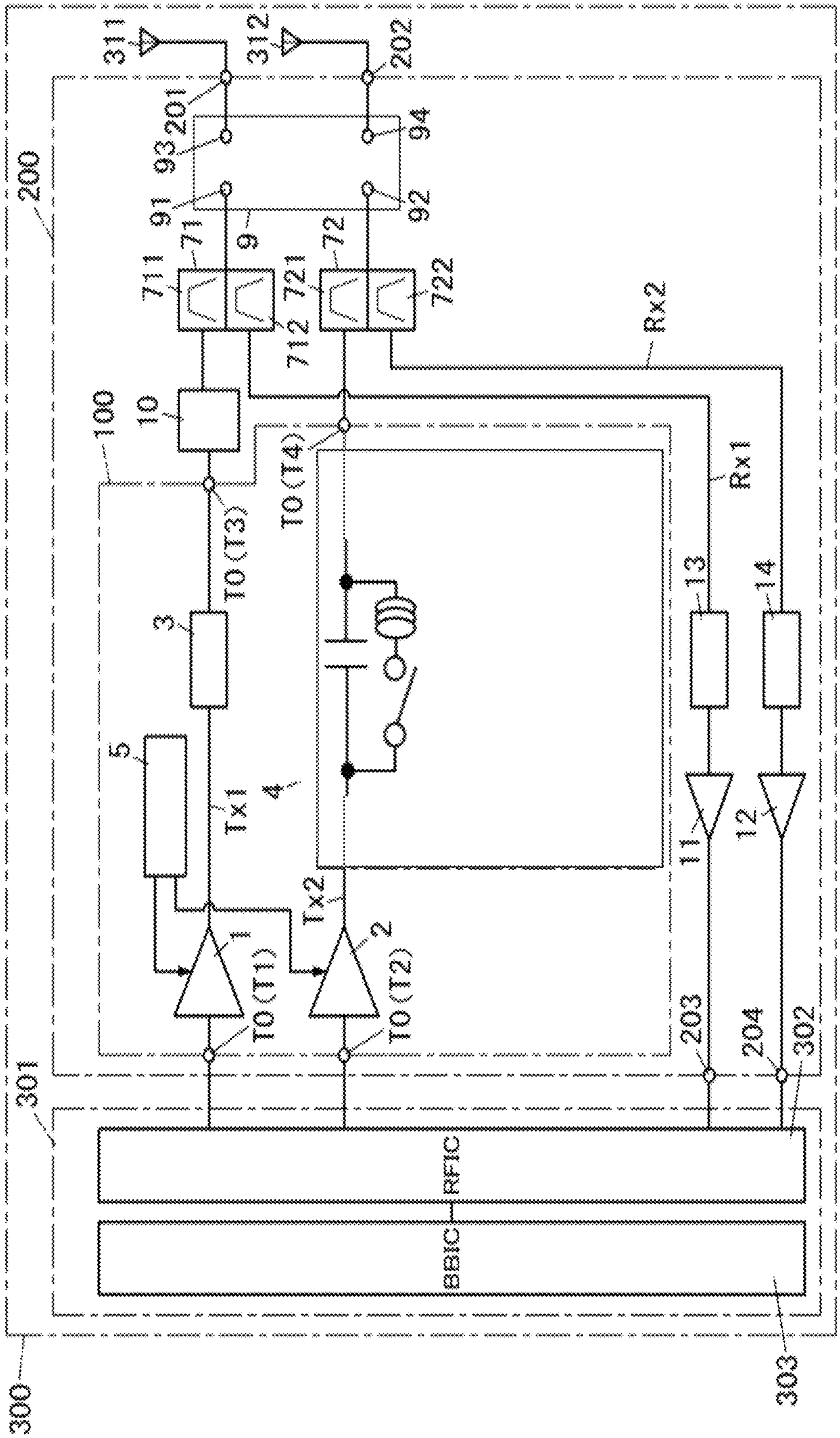
Figure 20:
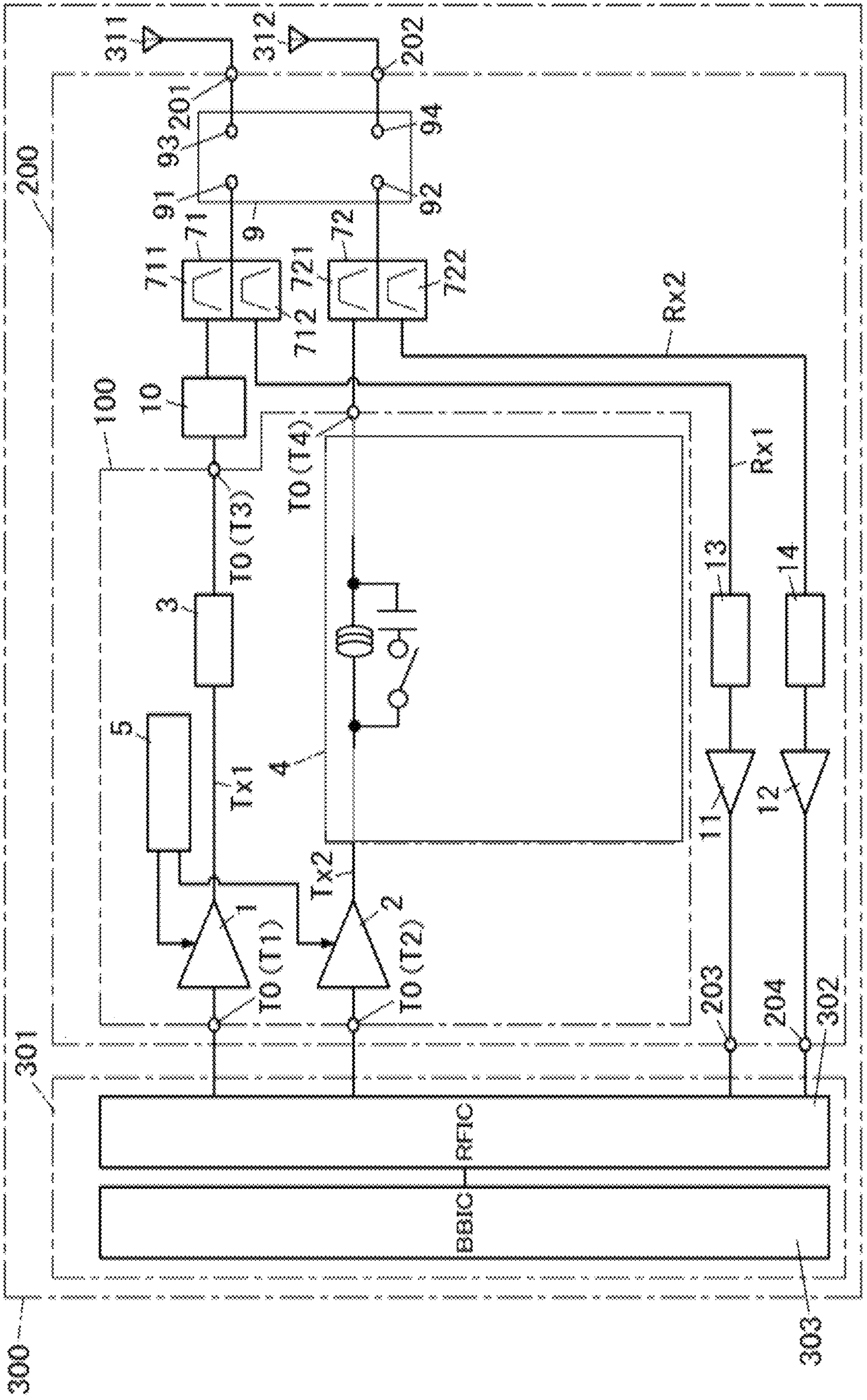

A radio frequency module 100H according to Embodiment 9 will be described with reference to FIG. 16. Regarding the radio frequency module 100H according to Embodiment 9, the same components as the radio frequency module 100 (see FIGS. 1 to 4) according to Embodiment 1 are attached with the same reference numerals, and the description thereof will be omitted. In addition, regarding a radio frequency system 200H including the radio frequency module 100H, the same components as the radio frequency system 200 (see FIG. 1) according to Embodiment 1 are attached with the same reference numerals, and the description thereof is omitted. In addition, regarding a communication device 300H including the radio frequency system 200H, the same components as the communication device 300 (see FIG. 1) according to Embodiment 1 are attached with the same reference numerals, and the description thereof is omitted.

(1) Circuit Configuration of Radio Frequency Module, Radio Frequency System and Communication Device The radio frequency system 200H according to Embodiment 9 includes the radio frequency module 100H instead of the radio frequency module 100 in the radio frequency system 200 (see FIG. 1) according to Embodiment 1.

Similarly to the radio frequency module 100 according to Embodiment 1, the radio frequency module 100H according to Embodiment 9 includes the first power amplifier 1, the second power amplifier 2, the first output matching circuit 3, and the control circuit 5.

In addition, the radio frequency module 100H according to Embodiment 9 includes a second output matching circuit 4H instead of the second output matching circuit 4 in the radio frequency module 100 according to Embodiment 1.

The second output matching circuit 4H includes a plurality of (three in the example of FIG. 16) inductors L1, L2, and L3, the plurality of (three in the example of FIG. 16) capacitors C1, C2, and C3, and the selection switch S1.

The inductor L1 is provided in the second transmission path Tx2 and is connected between the output terminal of the second power amplifier 2 and the second signal output terminal T4.

The capacitor C1 is connected between the path between the inductor L1 and the second signal output terminal T4 in the second transmission path Tx2 and a ground.

The selection switch S1, the capacitor C2, and the inductor L2 are connected in series between the second transmission path Tx2 and a ground. Here, the selection switch S1, the capacitor C2, and the inductor L2 are connected in series between the path between the inductor L1 and the second signal output terminal T4 in the second transmission path Tx2 and a ground.

In addition, the capacitor C3 and the inductor L3 are connected in series between the path between the inductor L1 and the second signal output terminal T4 in the second transmission path Tx2 and a ground. More specifically, one end of the capacitor C3 is connected to the path between the inductor L1 and the second signal output terminal T4 in the second transmission path Tx2, the other end of the capacitor C3 is connected to one end of the inductor L3, and the other end of inductor L3 is connected to a ground.

In the second output matching circuit 4H, the capacitance of the capacitor C2 connected in series to the selection switch S1 is different from the capacitance of the capacitor C3. As an example, the capacitance of the capacitor C2 is larger than the capacitance of the capacitor C3. In the second output matching circuit 4H, for example, the capacitance of the capacitor C2 is 100 pF, and the capacitance of the capacitor C3 is 0.1 pF.

The selection switch S1 is, for example, a MOSFET. The selection switch S1 is controlled by, for example, the control circuit 5. The second output matching circuit 4H switches between the impedance matching function and the harmonic wave suppression function of reducing harmonic wave noise outputted from the first power amplifier 1 by switching the state of the selection switch S1. The state of the selection switch S1 includes on and off.

In the second output matching circuit 4H, assuming the second power amplifier 2 is configured to be operable, the selection switch S1 is controlled to be off by the control circuit 5. Accordingly, the second output matching circuit 4G has an impedance matching function of matching the impedance between the output terminal of the second power amplifier 2 and the second transmission filter 721 of the second duplexer 72.

In the second output matching circuit 4H, assuming the first power amplifier 1 is configured to be operable, the selection switch S1 is controlled to be on by the control circuit 5. Accordingly, the second output matching circuit 4H has a harmonic wave suppression function of reducing the harmonic wave noise outputted from the first power amplifier 1.

The communication device 300H includes the radio frequency module 100H instead of the radio frequency module 100 in the communication device 300 according to Embodiment 1.

(2) Structure of Radio Frequency Module

Since the structure of the radio frequency module 100H according to Embodiment 9 is substantially the same as the structure of the radio frequency module 100 according to Embodiment 1 (see FIGS. 2 to 4), the illustration and description are omitted.

(3) Effect

In the radio frequency module 100H according to Embodiment 9, the second output matching circuit 4H switches between the impedance matching function and the harmonic wave suppression function of reducing the harmonic wave noise outputted from the first power amplifier 1 by switching the state of the selection switch S1. As a result, the radio frequency module 100H according to Embodiment 9 can achieve size reduction while harmonic wave noise is suppressed.

FIGS. 17-20 are circuit diagrams of a radio frequency module according to Embodiments 10-13, which provide alternative arrangements of the inductor(s), capacitor(s) and switch(es) of the second output matching circuit 4 first illustrated in FIG. 1.

Embodiments 1 to 13 or the like described above are merely one of various embodiments of the present disclosure. Various modifications to Embodiments 1 to 9 or the like described above are possible according to the design or the like as long as the object of the present disclosure can be achieved.

Aspects

The following aspects are disclosed in the present specification.

A radio frequency module (100; 100A; 100B; 100C; 100D; 100E; 100F; 100G; and 100H) according to a first aspect includes a first power amplifier (1), a second power amplifier (2), and a matching circuit (the second output matching circuits 4; 4D; 4E; 4F; 4G; and 4H). The first power amplifier (1) is configured to be able to amplify a signal in a first communication band. The second power amplifier (2) is configured to be able to amplify a signal in a second communication band different from the first communication band. The matching circuit is connected to an output terminal of the second power amplifier (2) and is connected to a reception path (the second reception path Rx2). The matching circuit includes at least one capacitor (C2), an inductor (L1) connected in series to the capacitor (C2), and a selection switch (S1). The matching circuit switches between an impedance matching function and a harmonic wave suppression function of reducing harmonic wave noise outputted from the first power amplifier (1) by switching a state of the selection switch (S1).

According to the aspect, it is possible to achieve size reduction while harmonic wave noise is suppressed.

The radio frequency module (100; 100A; 100B; and 100C) according to a second aspect includes the first power amplifier (1), the second power amplifier (2), and the matching circuit (the second output matching circuit 4). The first power amplifier (1) is configured to be able to amplify a signal in a first communication band. The second power amplifier (2) is configured to be able to amplify a signal in a second communication band different from the first communication band. The matching circuit is connected to an output terminal of the second power amplifier (2) and is connected to a reception path (the second reception path Rx2). The matching circuit includes a first capacitor (the capacitor C2), the inductor (L2), and a second capacitor (the capacitor C3) connected in series between a transmission path (the second transmission path Tx2) connected to the output terminal of the second power amplifier (2) and a ground, and the selection switch (S1) connected in parallel to the second capacitor (the capacitor C3). A capacitance of the first capacitor (the capacitor C2) is larger than a capacitance of the second capacitor (the capacitor C3).

According to the aspect, it is possible to achieve size reduction while harmonic wave noise is suppressed.

In the radio frequency module (100; 100A; 100B; and 100C) according to a third aspect, in the second aspect, a series circuit including the first capacitor (the capacitor C2), the inductor (L2), and the second capacitor (the capacitor C3) is connected to the reception path (the second reception path Rx2) without any of a remaining plurality of circuit elements (the inductor L1 and the capacitor C1) included in the matching circuit interposed therebetween.

According to the aspect, the harmonic wave noise of the transmission signal outputted from the first power amplifier (1) can be more effectively reduced.

In the radio frequency module (100; 100A; 100B; and 100C) according to a fourth aspect, in the second or third aspect, the selection switch (S1) is on assuming the first power amplifier (1) is configured to be operable, and is off assuming the second power amplifier (2) is configured to be operable.

According to the aspect, assuming the first power amplifier (1) operates, the harmonic wave noise can be reduced by a second output matching circuit (4), and assuming the second power amplifier (2) operates, impedance matching can be performed by the second output matching circuit (4).

The radio frequency module (100; 100A; 100B; and 100C) according to a fifth aspect further includes a module substrate (6) in any one of the second to fourth aspects. The first power amplifier (1) and the second power amplifier (2) are disposed on the module substrate (6). The inductor (L2) includes a conductor pattern portion (64) formed on the module substrate (6).

According to the aspect, a design of an inductance of the inductor L2 is easy while size reduction is achieved.

The radio frequency module (100; 100A; 100B; and 100C) according to a sixth aspect, in the fifth aspect, further includes an IC (110; 120; and 140) disposed on the module substrate (6). The selection switch (S1) and the second capacitor (the capacitor C3) are included in the IC (110; 120; 140; and 150).

According to the aspect, it is possible to achieve further size reduction.

In the radio frequency module (100) according to a seventh aspect, in the sixth aspect, the IC (110) includes the control circuit (5) that controls the first power amplifier (1) and the second power amplifier (2). The control circuit (5) controls the selection switch (S1).

According to the aspect, in the control circuit (5), it is possible to synchronize the control of the first power amplifier (1) and the control of the selection switch (S1) and to synchronize the control of the second power amplifier (2) and the control of the selection switch (S1).

In the radio frequency module (100A and 100B) according to an eighth aspect, in the sixth aspect, the IC (120 and 140) includes a band select switch (10) connected to an output terminal of the first power amplifier (1).

According to the aspect, it is possible to reduce the size in the configuration including the band select switch (10).

In the radio frequency module (100B) according to a ninth aspect, in the sixth aspect, the IC (140) includes the band select switch (10) and the control circuit (5). The band select switch (10) is connected to the output terminal of the first power amplifier (1). The control circuit (5) controls the first power amplifier (1) and the second power amplifier (2).

In the radio frequency module (100B) according to a tenth aspect, in the seventh or ninth aspect, the control circuit (5) controls the selection switch (S1).

According to the aspect, the control circuit (5) can control the selection switch (S1) to be on assuming the first power amplifier (1) is operated, and can control the selection switch (S1) to be off assuming the second power amplifier (2) is operated.

The radio frequency module (100B and 100C) according to an eleventh aspect, in the second aspect, further includes a switch (9*a*). The switch (9*a*) is connected between the output terminal of the first power amplifier (1) and an antenna terminal (the first antenna terminal T5).

The radio frequency module (100C) according to a twelfth aspect, in the eleventh aspect, further includes the module substrate (6) and the IC (150) disposed on the module substrate (6). The selection switch (S1), the switch (9*a*), and the second capacitor (C3) are included in the IC (150).

According to the aspect, it is possible to reduce harmonic wave noise while size reduction is achieved.

What is claimed is:

1. A radio frequency module comprising:
- a first power amplifier configured to amplify a signal in a first communication band;
- a second power amplifier configured to amplify a signal in a second communication band different from the first communication band; and
- a matching circuit that is connected to an output terminal of the second power amplifier and connected to a reception path,
- wherein the matching circuit includes
- a first capacitor, an inductor, and a second capacitor that are connected in series between a transmission path connected to the output terminal of the second power amplifier and a ground, and
- a selection switch that is connected in parallel to the second capacitor, and
- a capacitance of the first capacitor is larger than a capacitance of the second capacitor.

2. The radio frequency module according to claim 1,
- wherein a series circuit including the first capacitor, the inductor, and the second capacitor is connected to the reception path without any of a remaining plurality of circuit elements included in the matching circuit interposed therebetween.

3. The radio frequency module according to claim 2,
- wherein the selection switch
- is on based on the first power amplifier being configured to be operable, or
- is off based on the second power amplifier being configured to be operable.

4. The radio frequency module according to claim 1, further comprising:
- a module substrate,
- wherein the first power amplifier and the second power amplifier are disposed on the module substrate, and
- the inductor includes a conductor pattern portion formed on the module substrate.

5. The radio frequency module according to claim 4, further comprising:
- a resin layer disposed on a first main surface of the module substrate and covering at least a portion of each of the first power amplifier and the second power amplifier; and
- a shield electrode layer disposed on the resin layer.

6. The radio frequency module according to claim 4, further comprising:
- an IC disposed on the module substrate,
- wherein the selection switch and the second capacitor are included in the IC.

7. The radio frequency module according to claim 6, wherein the IC includes a control circuit that controls the first power amplifier and the second power amplifier, and the control circuit controls the selection switch.

8. The radio frequency module according to claim 7, wherein the control circuit controls the selection switch.

9. The radio frequency module according to claim 6, wherein the IC includes a band select switch that is connected to an output terminal of the first power amplifier.

10. The radio frequency module according to claim 9, wherein the control circuit controls the selection switch.

11. The radio frequency module according to claim 6, wherein the IC includes a band select switch that is connected to an output terminal of the first power amplifier, and a control circuit that controls the first power amplifier and the second power amplifier.

12. The radio frequency module according to claim 11, wherein the control circuit controls the selection switch.

13. The radio frequency module according to claim 6, wherein the second capacitor and the selection switch are adjacent to each other in a plan view from a thickness direction of the module substrate with no other circuit element disposed therebetween.

14. The radio frequency module according to claim 1, further comprising:

a switch, wherein the switch is connected between an output terminal of the first power amplifier and an antenna terminal.

15. The radio frequency module according to claim 14, further comprising:

a module substrate; and an IC disposed on the module substrate, wherein the selection switch, the switch, and the second capacitor are included in the IC.

16. The radio frequency module according to claim 1, wherein the selection switch is on based on the first power amplifier being configured to be operable, or is off based on the second power amplifier being configured to be operable.

17. The radio frequency module according to claim 1, wherein a resonant frequency of an LC resonance circuit formed by the first capacitor and the inductor when the selection switch is on corresponds to a frequency of a harmonic wave of a transmission signal in the first communication band.

18. The radio frequency module according to claim 1, wherein the capacitance of the first capacitor is at least two orders of magnitude larger than the capacitance of the second capacitor.

19. The radio frequency module according to claim 1, wherein a frequency of a harmonic wave of a transmission band of the first communication band is included within a reception band of the second communication band.

20. A radio frequency system comprising:

the radio frequency module according to claim 1; and a signal processing circuit connected to the first power amplifier and the second power amplifier.

* * * * *